(12) United States Patent
Xiong et al.

(10) Patent No.: US 11,895,680 B2
(45) Date of Patent: Feb. 6, 2024

(54) PHYSICAL UPLINK SHARED CHANNEL BASED SMALL DATA TRANSMISSION

(71) Applicant: Intel Corporation, Santa Clara, CA (US)

(72) Inventors: Gang Xiong, Portland, OR (US); Sergey Sosnin, Zavolzhie (RU)

(73) Assignee: Intel Corporation, Santa Clara, CA (US)

(*) Notice: Subject to any disclaimer, the term of this patent is extended or adjusted under 35 U.S.C. 154(b) by 339 days.

(21) Appl. No.: 17/032,700

(22) Filed: Sep. 25, 2020

(65) Prior Publication Data

US 2021/0022143 A1 Jan. 21, 2021

Related U.S. Application Data

(60) Provisional application No. 62/962,095, filed on Jan. 16, 2020, provisional application No. 62/931,016, filed on Nov. 5, 2019, provisional application No. 62/906,474, filed on Sep. 26, 2019.

(51) Int. Cl.
| | | |
|---|---|---|
| H04W 72/00 | (2023.01) | |
| H04W 72/53 | (2023.01) | |
| H04L 1/00 | (2006.01) | |
| H04W 56/00 | (2009.01) | |
| H04W 72/0453 | (2023.01) | |
| H04L 5/10 | (2006.01) | |
| H04L 5/00 | (2006.01) | |
| H04L 1/1812 | (2023.01) | |
| H04L 5/14 | (2006.01) | |
| H04W 76/27 | (2018.01) | |
| H04W 72/21 | (2023.01) | |
| H04L 1/1867 | (2023.01) | |

(52) U.S. Cl.
CPC .......... *H04W 72/53* (2023.01); *H04L 1/0003* (2013.01); *H04L 1/1819* (2013.01); *H04L 1/1896* (2013.01); *H04L 5/0051* (2013.01); *H04L 5/10* (2013.01); *H04L 5/1469* (2013.01); *H04W 56/001* (2013.01); *H04W 72/0453* (2013.01); *H04W 72/21* (2023.01); *H04W 76/27* (2018.02)

(58) Field of Classification Search
None
See application file for complete search history.

(56) References Cited

U.S. PATENT DOCUMENTS

| | | | | |
|---|---|---|---|---|
| 2013/0308504 | A1* | 11/2013 | Nimbalker | H04L 5/0094 370/329 |
| 2014/0293881 | A1* | 10/2014 | Khoshnevis | H04L 5/0094 370/329 |
| 2019/0149269 | A1* | 5/2019 | Chatterjee | H04W 72/1268 370/329 |
| 2019/0372721 | A1* | 12/2019 | Lee | H04L 1/1861 |

(Continued)

*Primary Examiner* — Brandon M Renner
(74) *Attorney, Agent, or Firm* — Schwabe, Williamson & Wyatt, P.C.

(57) ABSTRACT

Various embodiments herein provide techniques for physical uplink shared channel (PUSCH) only based small data transmission. For example, described herein are: configuration of pre-allocated UL resource (PUR) set; association of synchronization signal block (SSB) and PUSCH transmission; scrambling sequence generation of the PUSCH transmission; and a procedure for PUSCH only transmission carrying small data. Other embodiments may be described and claimed.

18 Claims, 13 Drawing Sheets

(56) References Cited

U.S. PATENT DOCUMENTS

| | | | |
|---|---|---|---|
| 2020/0029302 A1* | 1/2020 | Cox | H04W 52/0235 |
| 2020/0389886 A1* | 12/2020 | Lee | H04W 72/21 |
| 2021/0014005 A1* | 1/2021 | Ying | H04L 1/1887 |
| 2021/0127396 A1* | 4/2021 | Su | H04W 72/0453 |
| 2021/0168011 A1* | 6/2021 | Davydov | H04L 1/0025 |
| 2022/0116152 A1* | 4/2022 | Iyer | H04L 1/188 |
| 2022/0191925 A1* | 6/2022 | Li | H04B 7/0834 |
| 2022/0225357 A1* | 7/2022 | Yan | H04W 68/005 |
| 2022/0271890 A1* | 8/2022 | Grossmann | H04L 5/0051 |
| 2022/0272767 A1* | 8/2022 | Liu | H04W 76/30 |

* cited by examiner

Figure 1. 2-Step RACH procedure

Figure 2. PUR set configuration

Figure 3. Contention based and contention free PUSCH resource units

Figure 4. Association between SSB and PUSCH resource: when one SSB block is associated with more than PUSCH resource Figure 5. Association between SSB and PUSCH resource: when more than one SSB block is associated with one PUSCH resource Figure 6. Procedure for contention based PUSCH only small data transmission

PHYSICAL UPLINK SHARED CHANNEL BASED SMALL DATA TRANSMISSION

CROSS REFERENCE TO RELATED APPLICATION

The present application claims priority to U.S. Provisional Patent Application No. 62/906,474, which was filed Sep. 26, 2019; U.S. Provisional Patent Application No. 62/931,016, which was filed Nov. 5, 2019; and U.S. Provisional Patent Application No. 62/962,095, which was filed Jan. 16, 2020; the disclosures of which are hereby incorporated by reference.

FIELD

Embodiments relate generally to the technical field of wireless communications.

BACKGROUND

Mobile communication has evolved significantly from early voice systems to today's highly sophisticated integrated communication platform. The next generation wireless communication system, 5G, or new radio (NR) will provide access to information and sharing of data anywhere, anytime by various users and applications. NR is expected to be a unified network/system that target to meet vastly different and sometime conflicting performance dimensions and services. Such diverse multi-dimensional requirements are driven by different services and applications. In general, NR will evolve based on 3GPP LTE-Advanced with additional potential new Radio Access Technologies (RATs) to enrich people lives with better, simple and seamless wireless connectivity solutions. NR will enable everything connected by wireless and deliver fast, rich contents and services.

In Release (Rel)-15 NR, a 4-step random access channel (RACH) procedure was defined. Further, in Rel-16 NR, 2-step RACH procedure is under discussion, with the motivation to allow fast access and low latency uplink transmission. More specifically, for 2-step RACH procedure, in the first step, UE transmits a physical random access channel (PRACH) preamble and associated MsgA physical uplink shared channel (PUSCH) on a configured time and frequency resource, where MsgA PUSCH may carry at least equivalent contents of Msg3 in 4-step RACH. After successful detection of PRACH preamble and decoding of MsgA PUSCH, next generation NodeB (gNB) transmits MsgB in the second step which may carry equivalent contents of Msg2 and Msg4 in 4-step RACH.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

Mobile communication has evolved significantly from early voice systems to today's highly sophisticated integrated communication platform. The next generation wireless communication system, 5G, or new radio (NR) will provide access to information and sharing of data anywhere, anytime by various users and applications. NR is expected to be a unified network/system that target to meet vastly different and sometime conflicting performance dimensions and services. Such diverse multi-dimensional requirements are driven by different services and applications. In general, NR will evolve based on 3GPP LTE-Advanced with additional potential new Radio Access Technologies (RATs) to enrich people lives with better, simple and seamless wireless connectivity solutions. NR will enable everything connected by wireless and deliver fast, rich contents and services.

Figure 1:
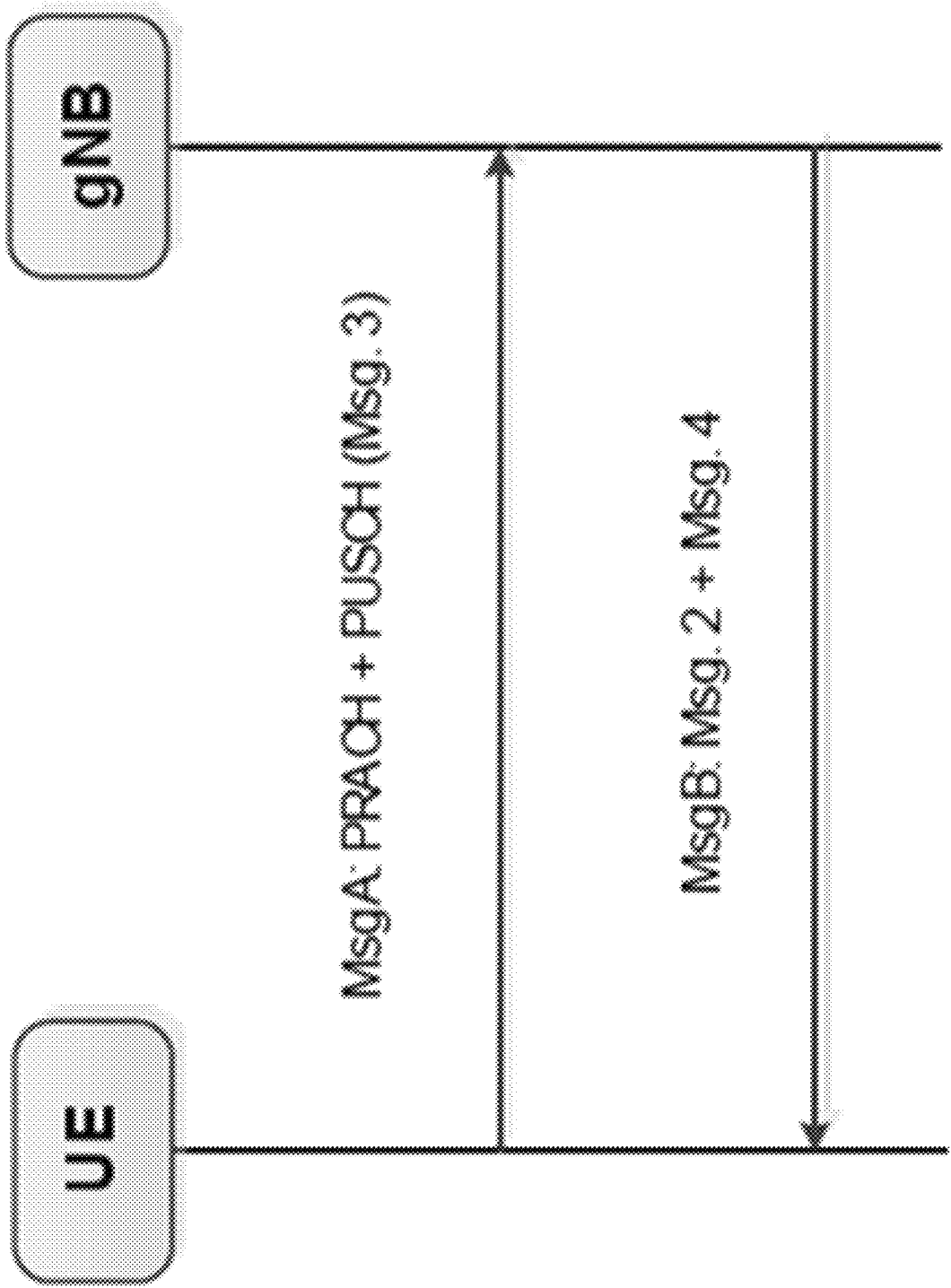
FIG. 1 illustrates a two-step random access channel (RACH) procedure in accordance with various embodiments.

In Rel-15 NR, 4-step random access channel (RACH) procedure was defined. Further, in Rel-16 NR, 2-step RACH procedure is under the discussion, with the motivation to allow fast access and low latency uplink transmission. More specifically, for 2-step RACH procedure, in the first step, UE transmits a physical random access channel (PRACH) preamble and associated message (Msg) A (MsgA) physical uplink shared channel (PUSCH) on a configured time and frequency resource, where MsgA PUSCH may carry at least equivalent contents of Msg3 in 4-step RACH. After successful detection of PRACH preamble and decoding of MsgA PUSCH, gNB transmits MsgB in the second step which may carry equivalent contents of Msg2 and Msg4 in 4-step RACH. FIG. 1 illustrates the 2-step RACH procedure.

Note that for certain scenarios, e.g., small cell network or industrial wireless sensor network (IWSN) where most of the sensors are stationary, PRACH preamble transmission in the 2-step RACH procedure may not be needed since timing advance is either within the length of a cyclic prefix (CP) by the deployment or with little change.

In this case, direct data transmission on PUSCH within pre-allocated uplink (UL) resource (PUR) may be considered without associated PRACH preamble transmission, which can help reduce data transmission delay and save the UE power consumption. Moreover, for UEs in RRC_INACTIVE mode, small data transmission can be completed without moving into RRC_CONNECTED mode, thereby saving state transition signalling overhead.

In this disclosure, detailed design on PUSCH only based small data transmission is described. For example, described herein are:

Configuration of pre-allocated UL resource.
Association of synchronization signal block (SSB) and PUSCH transmission
Scrambling sequence generation of the PUSCH transmission
Procedure for PUSCH only transmission carrying small data.
Configuration of Pre-Allocated UL Resource As mentioned above, for certain scenarios, e.g., small cell network or industrial wireless sensor network (IWSN) where most of the sensors are stationary, PRACH preamble transmission in the 2-step RACH procedure may not be needed since timing advance is either within the length of a cyclic prefix (CP) by the deployment or with little change.

In this case, direct data transmission on PUSCH within pre-allocated UL resource (PUR) may be considered without associated PRACH preamble transmission, which can help reduce data transmission delay and save the UE power consumption. Moreover, for UEs in RRC_INACTIVE mode, small data transmission can be completed without moving into RRC_CONNECTED mode, thereby saving state transition signalling overhead.

Embodiments of configuration of pre-allocated UL resource are provided as follows:

In one embodiment of the disclosure, multiple sets of pre-allocated UL resources (PUR) may be configured by higher layers via NR minimum system information (MSI), NR remaining minimum system information (RMSI), NR other system information (OSI) or radio resource control (RRC) signalling. Note that one PUR set may be targeted and configured for one specific transport block size (TBS) and/or modulation and coding scheme (MCS).

For RRC_IDLE/INACTIVE mode UE, the PUR configuration may be configured by MSI, RMSI or OSI. For RRC_CONNECTED mode UE, the PUR configuration may be configured by dedicated RRC signalling. In case when PUR configuration is configured by dedicated RRC signalling, the PUR configuration may override the PUR configuration which is configured by MSI or RMSI or OSI. Further, the configuration of the PUR set may be configured per bandwidth part (BWP) or per cell.

In another embodiment of the disclosure, within a PUR set, multiple PUSCH resources or PUSCH occasions may be configured. The size of one or more PUSCH resources in time and frequency domain may be same or different within a PUR set. Further, for one PUSCH resource or occasion, the following parameters may be configured:

Time domain resource allocation: this may include but not limited to,
A PUR periodicity
Offset in relative to the system frame number (SFN) for the transmission of PUSCH, in terms of symbol, slot and subframe index
the number of PUSCH resources in a slot,
the number of PUSCH resources within a PUR periodicity
Starting symbol and length indicator value (SLIV) for the first PUSCH resource within a PUR set. Given that the size of each PUSCH resource in a PUR set is same, the starting symbol of other PUSCH resources in a slot can be derived accordingly. Alternatively, SLIV may include the starting symbol and overall length of the PUSCH resource if the number of PUSCH resources within a slot and across slot are contiguous in time.
In another option, a bitmap may be used to indicate the PUSCH resource in time within a PUR set periodicity. The size of bitmap may be equal to the periodicity. Further, the bit "1" may be used to indicate that the PUSCH resource is configured within the slot, while the bit "0" may be used to indicate that the PUSCH resource is nor configured within the slot. For instance, for bitmap "1000010000" may be used to indicate that PUSCH resource is configured in slot #0 and #5 within a periodicity of 10 slots.
The number of slots for a PUSCH resource, which is used for the slot aggregation or repetition of the corresponding PUSCH transmission
Guard period between PUSCH resources in a slot or across slot.
Frequency domain resource allocation
The number of PUSCH resource per PUR set in frequency
The starting PRB and size of each PUSCH resource, which can be based on resource indicator value (MV). In case when the number of PUSCH resources per PUR set is contiguous in frequency, the RIV may be used to indicate the starting PRB of the first PUSCH resource in frequency and the length of each PUSCH resource. Alternatively, the RIV may be used to indicate the starting PRB of the first PUSCH resource in frequency and the overall length of PUSCH resource in frequency within a PUR set.
The starting PRB may be defined in relative to the initial uplink (UL) bandwidth part (BWP) and/or active UL BWP or reference point A.
Indicator whether intra-slot frequency hopping and/or inter-slot frequency hopping is enabled or disabled. In case when intra-slot frequency hopping is enabled, the frequency offset between two frequency hops can be configured. Note that inter-slot frequency hopping is only applied when the slot aggregation or repetition is used for PUSCH transmission.

Numerology:
   Note that the numerology for the PUSCH transmission may be based on the numerology of active UL BWP.

Waveform:
   Whether cyclic prefix (CP)-orthogonal frequency division multiplexing (OFDM) or discrete Fourier transform (DFT)-spread (s)-OFDM is employed for the transmission of PUSCH. Note that this parameter may be separately configured or based on the parameter which is configured in the RMSI for Msg 3 transmission in 4-step RACH, or the parameter which is configured for MsgA PUSCH transmission in 2-step RACH. For example, if this parameter is not configured, the waveform is based on the parameter which is configured for MsgA PUSCH transmission in 2-step RACH.

Figure 2:
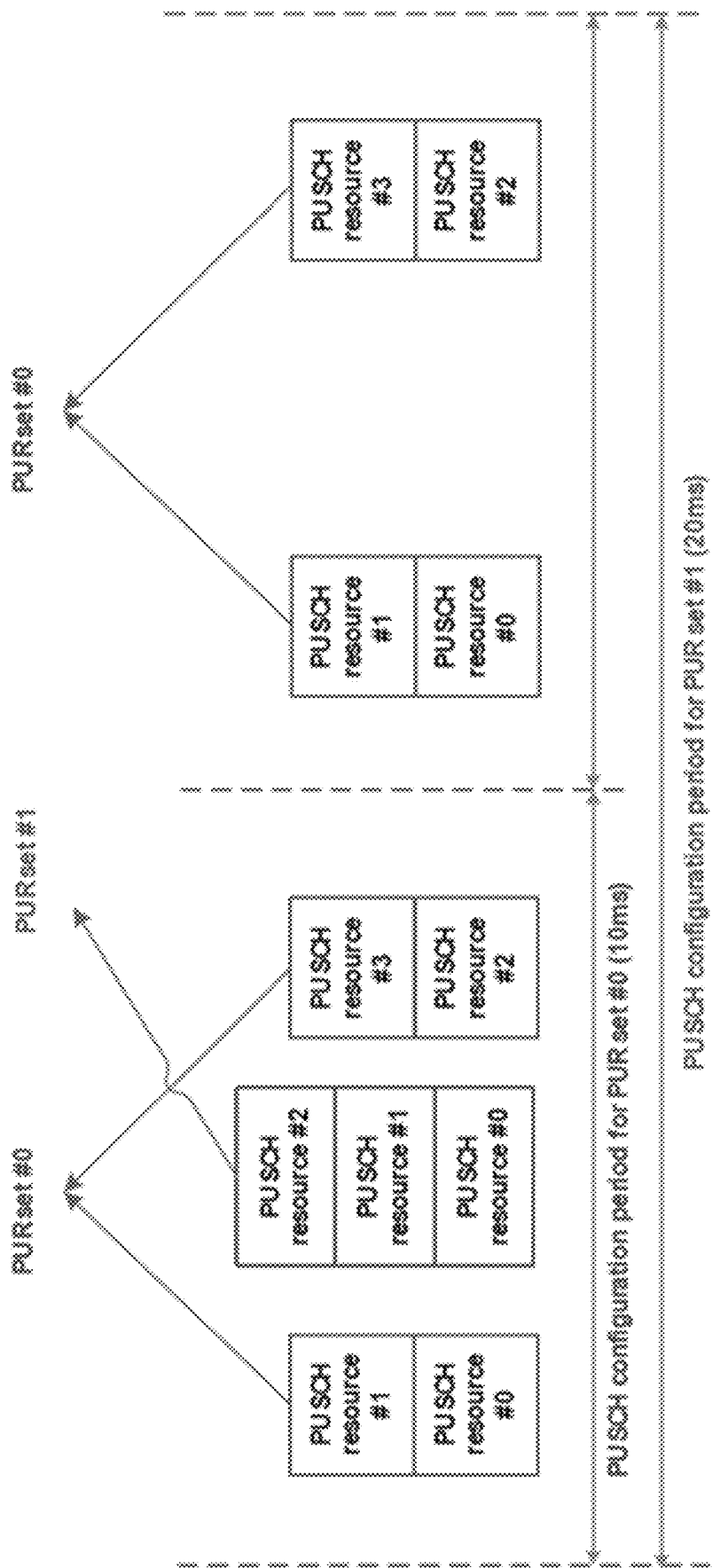
FIG. 2 illustrates an example pre-allocated uplink (UL) resource (PUR) set configuration in accordance with various embodiments.

Demodulation reference signal (DMRS) related configuration
   The number of DMRS antenna port (AP) for PUSCH transmission within a PUSCH resource/occasion
   The number of DMRS sequences for PUSCH transmission
   The number of DMRS symbols and positions
   Whether single or double DMRS symbols are used.
   PUSCH mapping type, e.g., mapping type A and B Hybrid automatic repeat request (HARQ) related parameters
   Maximum number of HARQ processes for PUSCH transmission
   Indication whether uplink control information (UCI) is piggybacked on PUSCH transmission
      In particular, bit "1" may be used to indicate that UCI can be piggybacked on PUSCH while bit "0" may not be used to indicate that UCI can be piggybacked on PUSCH FIG. 2 illustrates one example of PUR set configuration. In the example, PUSCH configuration periodicity for PUSCH set #0 and #1 are 10 ms and 20 ms, respectively. Further, 4 and 3 PUSCH resources are configured for PUSCH set #0 and #1, respectively.

In another embodiment of the disclosure, for time division duplexing (TDD) system or unpaired spectrum, if semi-static TDD downlink (DL)-UL configuration is configured, transmission occasion of PUSCH may only occupy UL or flexible symbol within a slot. Further, PUSCH cannot be transmitted when colliding with synchronization signal block (SSB). Further, similar to 4-step RACH, PUSCH may not be transmitted within a gap after DL symbols or SSB or may not be transmitted prior to SSB in a slot. Note the gap may be predefined in the specification or configured by higher layers (e.g., via MSI, RMSI, OSI or RRC signaling).

Further, in case when PUSCH resource in PUR set configuration collides in time and frequency with MsgA PUSCH in 2-step RACH, PUSCH resource in PUR set may be invalid. In other words, UE may not transmit the data in the PUSCH resource in PUR set and the SSB association with PUSCH resource is not applied.

Alternatively, the MsgA PUSCH is 2-step RACH may be invalid and UE may not transmit the MsgA PUSCH.

In another option, when PUSCH resource in PUR set overlaps in time and frequency with any 4-step or 2-step RACH occasions, PUSCH resource in PUR set is invalid. In other words, when PUSCH resource overlaps with RACH occasions in 2-step and 4-step RACH, UE cannot transmit PUSCH in these PUSCH resource in the PUR set.

In another embodiment of the disclosure, for the configuration of TBS and/or MCS, a set of TBS for small data transmission can be configured directly as {TBS_1, TBS_2, . . . , TBS_N}. Further, for one PUR set or PUSCH transmission, one TBS from the set of TBSs can be configured. The TBS calculation may reuse the TBS calculation as defined in NR Rel-15. Note that the TBS values are determined based on the size of time and frequency resource for PUSCH transmission.

Similarly, a set of MCS can be configured, which can be based on the MCS indexes ad defined in NR Rel-15. Further, for one PUR set or PUSCH transmission, one MCS from the set of MCSs can be configured.

In one embodiment of the disclosure, to indicate the MCS or TBS or different PUR set for PUSCH transmission, uplink control information (UCI) may be piggybacked on PUSCH, where the UCI is used to carry information regarding MCS or TBS of corresponding PUSCH transmission. The resource mapping of UCI on PUSCH may follow Rel-15 NR specification. Further, UCI may also include the new data indicator (NDI) and/or HARQ process ID.

In another option, whether UCI can be piggybacked on PUSCH may be configured by higher layers. For instance, uci-OnPUSCH can be configured to indicate whether UCI can be multiplexed on PUSCH.

As an alternative option, uci-OnPUSCH is always disabled for PUR based PUSCH transmission. In other words, UE cannot piggyback UCI on PUSCH for PUR based PUSCH transmission. In this case, when PUCCH overlaps with PUSCH for PUR based transmission in time within a PUCCH group, UE would drop one of the PUCCH or PUSCH. In one option, UE drops the PUSCH for PUR based transmission and only transmit PUCCH. In another option, UE drops the PUCCH and transmits the PUR based PUSCH in case of collision in time.

In another embodiment of the invention, redundancy version (RV) of 0 is used for PUR based PUSCH transmission for small data. This can be applied for the initial transmission and/or retransmission.

In another embodiment of the disclosure, in case when PUSCH with different MCS or TBS are transmitted in a same time and frequency resource, DMRS index partitioning may be used to indicate the MCS or TBS of corresponding PUSCH transmission.

Further, DMRS index may be represented as a form of DMRS AP, DMRS sequence or a combination thereof.

For instance, assuming total DMRS AP of 8, DMRS AP index #0-3 can be used to indicate that PUSCH transmission is associated with MCS #0 while DMRS AP index #4-7 can be used to indicate that PUSCH transmission is associated with MCS #1.

Association of Synchronization Signal Block (SSB) and PUSCH Transmission

Various embodiments may provide association between SSB and PUSCH transmission carrying small data.

In one embodiment of the disclosure, a PUSCH resource unit may be defined for the transmission of PUSCH carrying small data. More specifically, the PUSCH resource unit may be defined as one PUSCH resource unit and DMRS antenna port (AP) and/or DMRS sequence.

As mentioned above, the total number of DMRS AP and/or DMRS sequence for the PUSCH only transmission carrying small data may be configured. In this case, the total number of PUSCH resource units within a PUSCH resource/occasion per PUR set can be determined accordingly.

In one embodiment of the disclosure, certain PUSCH resource units within a PUSCH resource/occasion may be configured as contention based PUSCH resource unit, while the remaining PUSCH resource units may be configured as contention free PUSCH resource unit. For the latter case, the contention free PUSCH resource unit may be configured for RRC_CONNECTED mode UE by dedicated RRC signalling.

Figure 3:
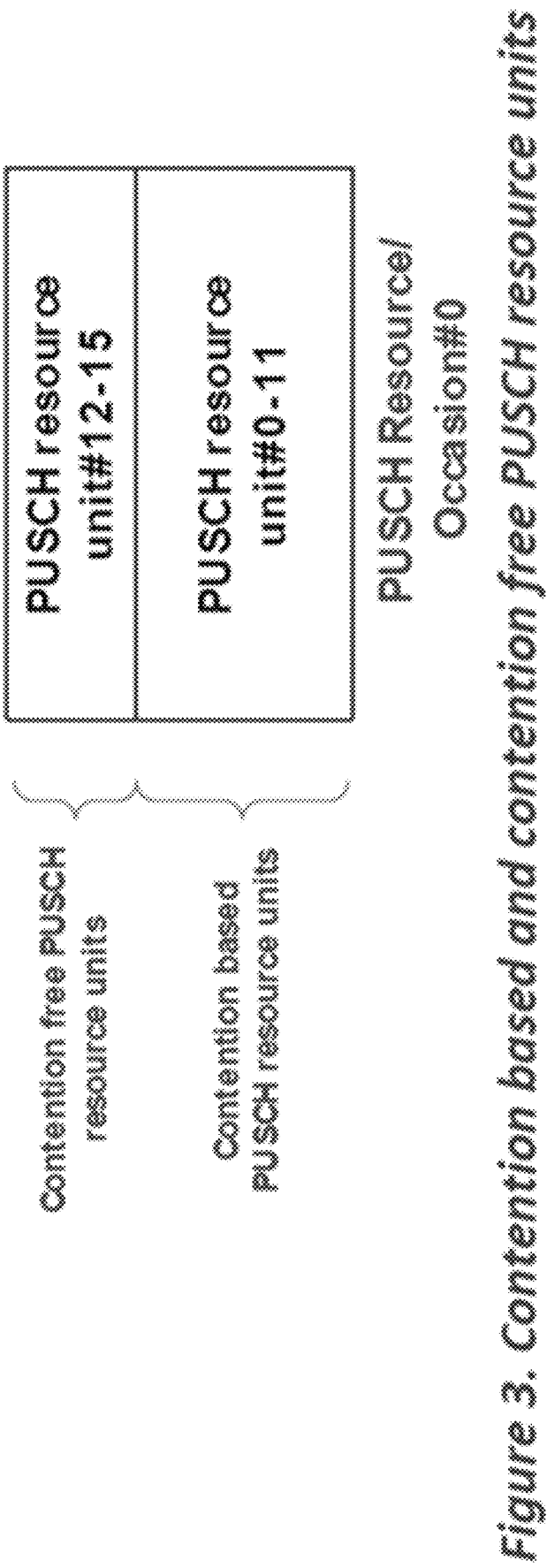
FIG. 3 illustrates an example of contention-based and contention-free physical uplink shared channel (PUSCH) resource units, in accordance with various embodiments.

FIG. 3 illustrates one example of contention based and contention free PUSCH resource units. In the example, the total number of PUSCH resource units is 16 for a PUSCH resource/occasion. Further, the first 12 PUSCH resource units are configured as contention based while the remaining can be allocated for contention free PUSCH resource unit.

In another embodiment of the disclosure, for a PUR set, if multiple PUSCH resources/occasions in a slot are configured, the PUSCH resource unit can be ordered as follows:
  First, in increasing order of DMRS port and/or sequence within a single PUSCH resource/occasion
  Second, in increasing order of frequency resource indexes for frequency multiplexed PUSCH resources/occasions
  Third, in increasing order of time resource indexes for time multiplexed PUSCH resources/occasions within an PUSCH slot
  Fourth, in increasing order of indexes for PUSCH slots If multiple PUSCH resources/occasions in a slot are not supported, the PUSCH resource unit can be ordered as follows:
  First, in increasing order of DMRS port and/or sequence within a single PUSCH resource/occasion
  Second, in increasing order of frequency resource indexes for frequency multiplexed PUSCH resources/occasions
  Third, in increasing order of indexes for PUSCH slots In another embodiment of the disclosure, for the association between SSB and valid PUSCH resource unit in PUR PUSCH occasion, the PUSCH resource unit can be order as follows:
  First, in increasing order of frequency resource indexes for frequency multiplexed PUSCH occasions
  Second, in increasing order of DMRS indexes within a single PUSCH occasion
  Third, in increasing order of time resource indexes for time multiplexed PUSCH occasions within a PUSCH slot
  Fourth, in increasing order of indexes for PUSCH slots If multiple PUSCH resources/occasions in a slot are not supported, the PUSCH resource unit can be ordered as follows:
  First, in increasing order of frequency resource indexes for frequency multiplexed PUSCH occasions
  Second, in increasing order of DMRS indexes within a single PUSCH occasion
  Third, in increasing order of indexes for PUSCH slots Note that the above order may be permuted with different orders for PUSCH resource unit.

Further, for the DMRS index, in one option, DMRS index is first ordered by DMRS port and then followed by DMRS sequence index. In another option, DMRS index is first ordered by sequence index and then followed by DMRS AP.

In another embodiment of the disclosure, the invalidation of PUSCH occasion for PUR based small data transmission can be similar to that was defined for invalidation rule of PUSCH occasion for 2-step RACH. More specifically, the invalidation rule for PUSCH occasion for PUR based small data transmission can be specified as follows:
  A PUSCH occasion is valid if it does not overlap in time and frequency with any PRACH occasion associated with either a Type-1 random access procedure or a Type-2 random access procedure. Additionally, if a UE is provided tdd-UL-DL-ConfigurationCommon, a PUSCH occasion is valid if
    it is within UL symbols, or
    it does not precede a SS/PBCH block in the PRACH slot and starts at least $N_{gap}$ symbols after a last downlink symbol and at least $N_{gap}$ symbols after a last SS/PBCH block transmission symbol, where $N_{gap}$ is provided in Table 8.1-2.

In another embodiment of the disclosure, the association between SSB and valid PO can be defined as follows:
An association period, starting from frame 0, for mapping SS/PBCH blocks to PUSCH occasions is the smallest value in the set determined by the PUSCH configuration period according Table 8.1-1 such that $N_{Tx}^{SSB}$ SS/PBCH blocks are mapped at least once to the PUSCH occasions within the association period, where a UE obtains $N_{Tx}^{SSB}$ from the value of ssb-PositionsInBurst in SIB1 or in ServingCellConfigCommon. If after an integer number of SS/PBCH blocks to PUSCH occasions mapping cycles within the association period there is a set of PUSCH occasions that are not mapped to $N_{Tx}^{SSB}$ SS/PBCH blocks, no SS/PBCH blocks are mapped to the set of PUSCH occasions. An association pattern period includes one or more association periods and is determined so that a pattern between PUSCH occasions and SS/PBCH blocks repeats at most every 160 msec. PUSCH occasions not associated with SS/PBCH blocks after an integer number of association periods, if any, are not used for PUSCH transmissions.

In another embodiment of the invention, for RRC_INACTIVE state UEs, UE can be configured with sounding reference signal (SRS) resource indicator, i.e., srs-ResourceIndicator to indicate which SRS resource is used for PUSCH transmission. This is similar to configuration of PUSCH with configured grant transmission.

In another embodiment of the invention, timing advance (TA) of 0 is applied for the transmission of PUSCH for PUR based transmission for RRC_Inactive or RRC_Idle state UEs.

In another embodiment of the disclosure, similar to the association between SSB and PRACH preamble for 4-step RACH, one or more SSB may be associated with one or more PUSCH resource/occasion per a PUR set.

Let us define a number N of SS/PBCH blocks associated with one PUSCH resource/occasion and a number R of PUSCH resource unit per SS/PBCH block per valid PUSCH resource/occasion. If N<1, one SS/PBCH block is mapped to 1/N consecutive valid PUSCH resource/occasion. Further, R PUSCH resource units with consecutive indexes associated with the SS/PBCH block per valid PUSCH resource/occasion start from PUSCH resource unit index 0.

Figure 4:
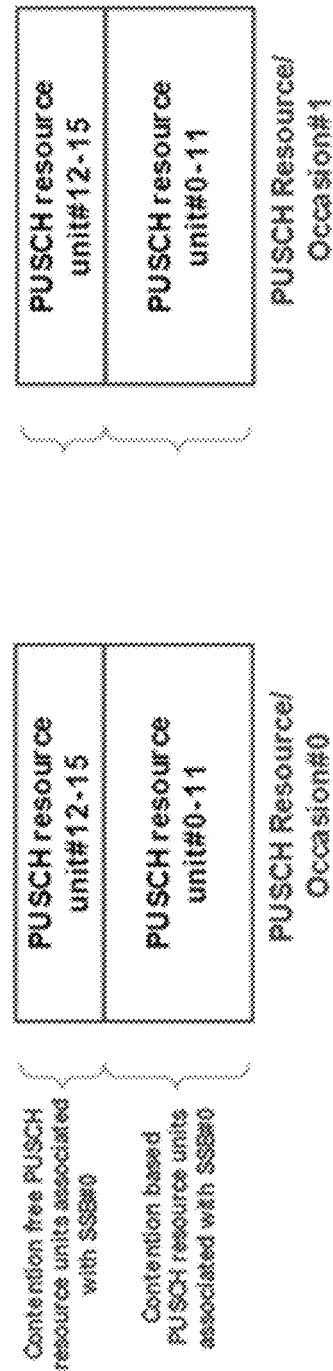
FIG. 4 illustrates an example association between synchronization signal block (SSB) and PUSCH resource wherein one SSB block is associated with more than one PUSCH resource, in accordance with various embodiments.

FIG. 4 illustrates one example of association between SSB and PUSCH resource wherein one SSB block is associated with more than PUSCH resource. In the example, N=1/2 and R=12. The total number of PUSCH resource units is 16 for a PUSCH resource/occasion. This indicates that one SSB block is associated with more than PUSCH resource.

Figure 5:
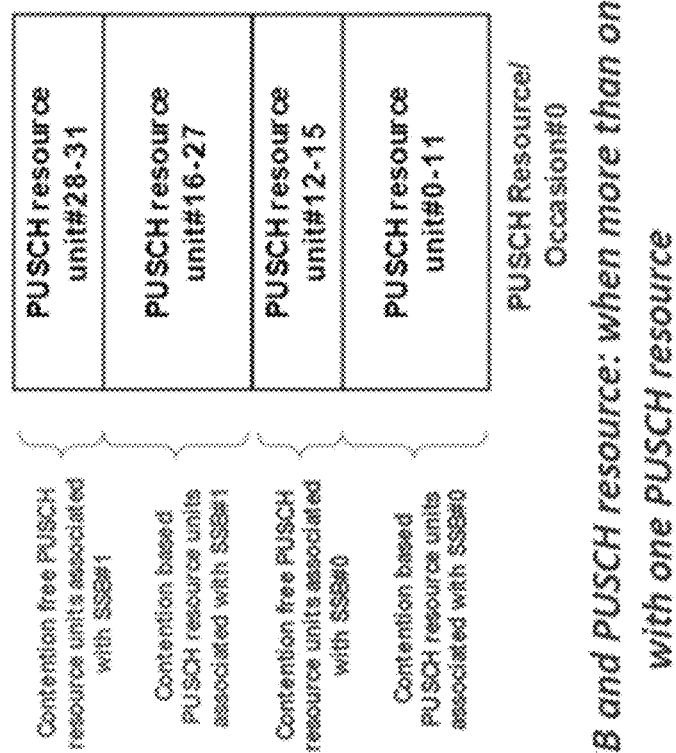
FIG. 5 illustrates an example association between SSB and PUSCH resource wherein one SSB block is associated with one PUSCH resource, in accordance with various embodiments.
Figure 6:
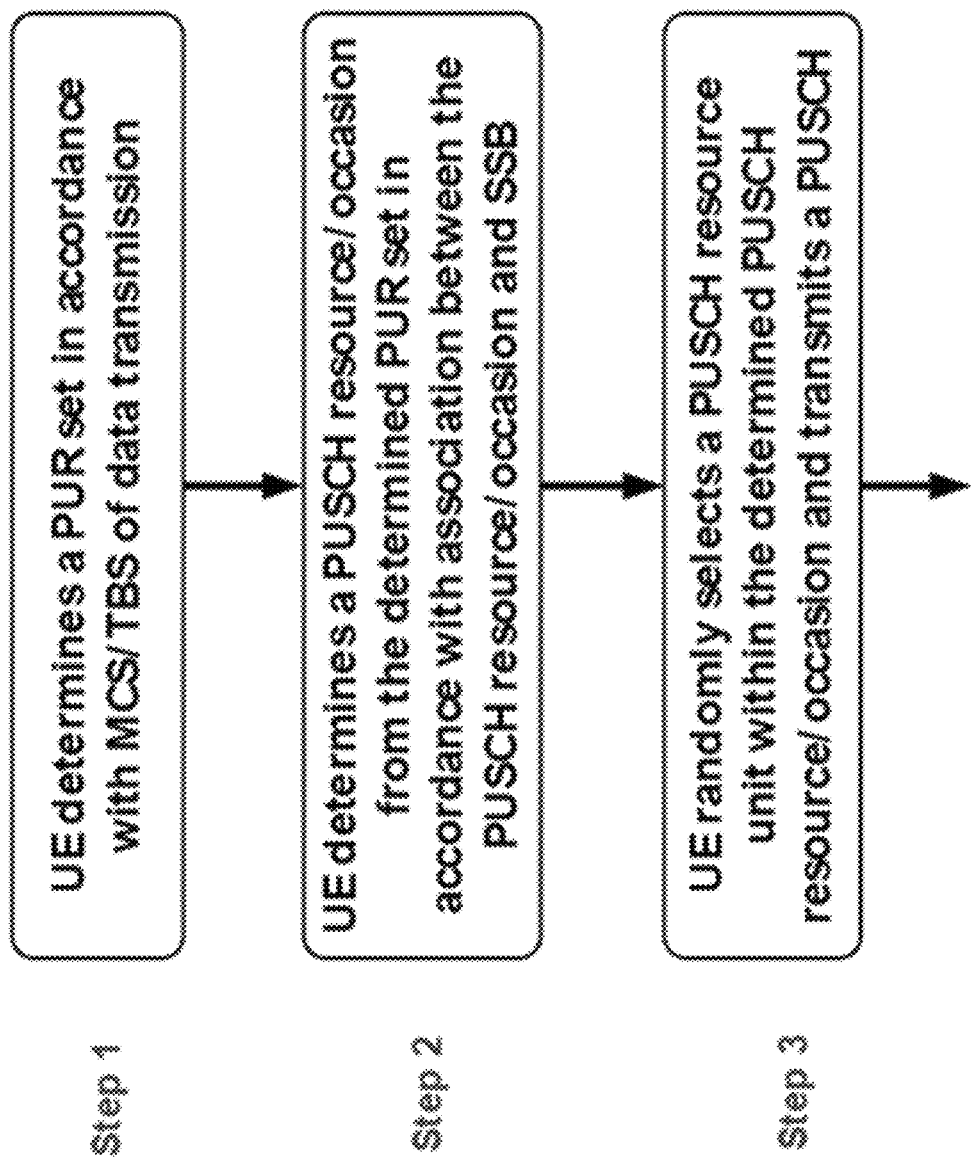
FIG. 6 illustrates a procedure for contention-based PUSCH only small data transmission, in accordance with various embodiments.

If N≥1, R contention based preambles with consecutive indexes associated with SS/PBCH block n, 0≤n≤N−1, per valid PUSCH resource/occasion start from preamble index $n \cdot N_{PRU}^{total}/N$ where $N_{PRU}^{total}$ is the number of PUSCH resource units for a PUSCH resource/occasion for contention based PUSCH only transmission and is an integer multiple of N, FIG. 5 illustrates one example of association between SSB and PUSCH resource wherein one SSB block is associated with more than PUSCH resource. In the example, N=2 and R=12. The total number of PUSCH resource units is 32 for a PUSCH resource/occasion. This indicates that two SSB blocks are associated with one PUSCH resource. Further, contention based PUSCH resource units #0-11 and #16-27 are associated with SSB #0 and #1, respectively.

Scrambling Sequence Generation of the PUSCH Transmission

Embodiments of initialization of scrambling sequence generator for PUSCH only transmission carrying small data are provided as follows:

In one embodiment of the disclosure, the scrambling sequence for PUSCH only transmission carrying small data may be initialized as a function of SSB index, DMRS index, or configurable ID. In particular, the scrambling sequence initialization seed can be given by:

$$c_{init} = f(n_{SSB}, n_{DMRS}, n_{ID})$$

Where $n_{SSB}$ is the SSB index, which is associated with PUSCH transmission carrying small data $n_{DMRS}$ is the DMRS index, which is selected for PUSCH transmission. It can be represented as DMRS AP, or DMRS sequence ID or a combination thereof.

$n_{ID}$ is the virtual cell ID, which can be configured by higher layers via MSI, RMSI, OSI or RRC signalling. If it is not configured, $n_{ID}$ is the physical cell ID.

In one option, the scrambling sequence initialization seed can be given by:

$$c_{init} = 2^{\alpha} \cdot n_{SSB} + 2^{\beta} \cdot n_{DMRS} + 2^{\gamma} \cdot n_{ID}$$

or $$c_{init} = 2^{\alpha} \cdot n_{SSB} + 2^{\beta} \cdot n_{DMRS} + 2^{\gamma} \cdot n_{ID}) \bmod 2^{-},$$

where α, β, and γ are nonnegative integers.

For instance, $$c_{init} = 2^{20} \cdot n_{SSB} + 2^{15} \cdot n_{DMRS} + n_{ID}$$

or $$c_{init} = 2^{19} \cdot n_{SSB} + 2^{15} \cdot n_{DMRS} + n_{ID}$$

In another option, the scrambling sequence initialization seed can be given by:

$$c_{init} = 2^{\beta} \cdot n_{DMRS} + 2^{\gamma} \cdot n_{ID}$$

For instance, $$c_{init} = 2^{15} \cdot n_{DMRS} + n_{ID}$$

In another option, the scrambling sequence initialization seed can be given by:

$$c_{init} = (2^{\alpha} \cdot n_{SSB} + 2^{\beta} \cdot n_{DMRS}) \cdot (2^{\gamma} \cdot n_{ID})$$

or $$c_{init} = (2^{\alpha} \cdot n_{SSB} + 2^{\beta} \cdot n_{DMRS}) \cdot (2^{\gamma} \cdot n_{ID}) \bmod 2^{31}$$

where α, β, and γ are nonnegative integers.

Procedure for PUSCH Only Transmission Carrying Small Data

Embodiments of the procedure for contention based and contention free PUSCH only small data transmission are provided as follows:

In one embodiment of the disclosure, the procedure for contention based PUSCH only small data transmission is described as follows:

In the first step, UE determines a PUR set in accordance with MCS/TBS of data transmission In the second step, UE determines a PUSCH resource/occasion from the determined PUR set in accordance with association between the PUSCH resource/occasion and SSB In the third step, UE randomly selects a PUSCH resource unit within the determined PUSCH resource/occasion and transmits a PUSCH In one embodiment of the disclosure, for contention free PUSCH only small data transmission, the first step and second step can follow the aforementioned procedure for contention based PUSCH only small data transmission. In the third step, UE uses a PUSCH resource unit which is configured by higher layers within the determined PUSCH resource/occasion and transmits a PUSCH.

In another embodiment of the disclosure, the procedure for contention based PUSCH only small data transmission may be applicable for RRC_IDLE and/or RRC_INACTIVE state UEs. For RRC_INACTIVE state UEs, when the dedicated PUR is configured for small data transmission, the procedure is described as follows:

In the first step, UE determines a PUR set in accordance with MCS/TBS of data transmission In the second step, UE determines a PUSCH resource/occasion from the determined PUR set In the third step, UE transmits a PUSCH on the determined PUSCH resource/occasion in accordance with sounding reference signal (SRS) resource indicator.

Systems and Implementations

Figure 9:
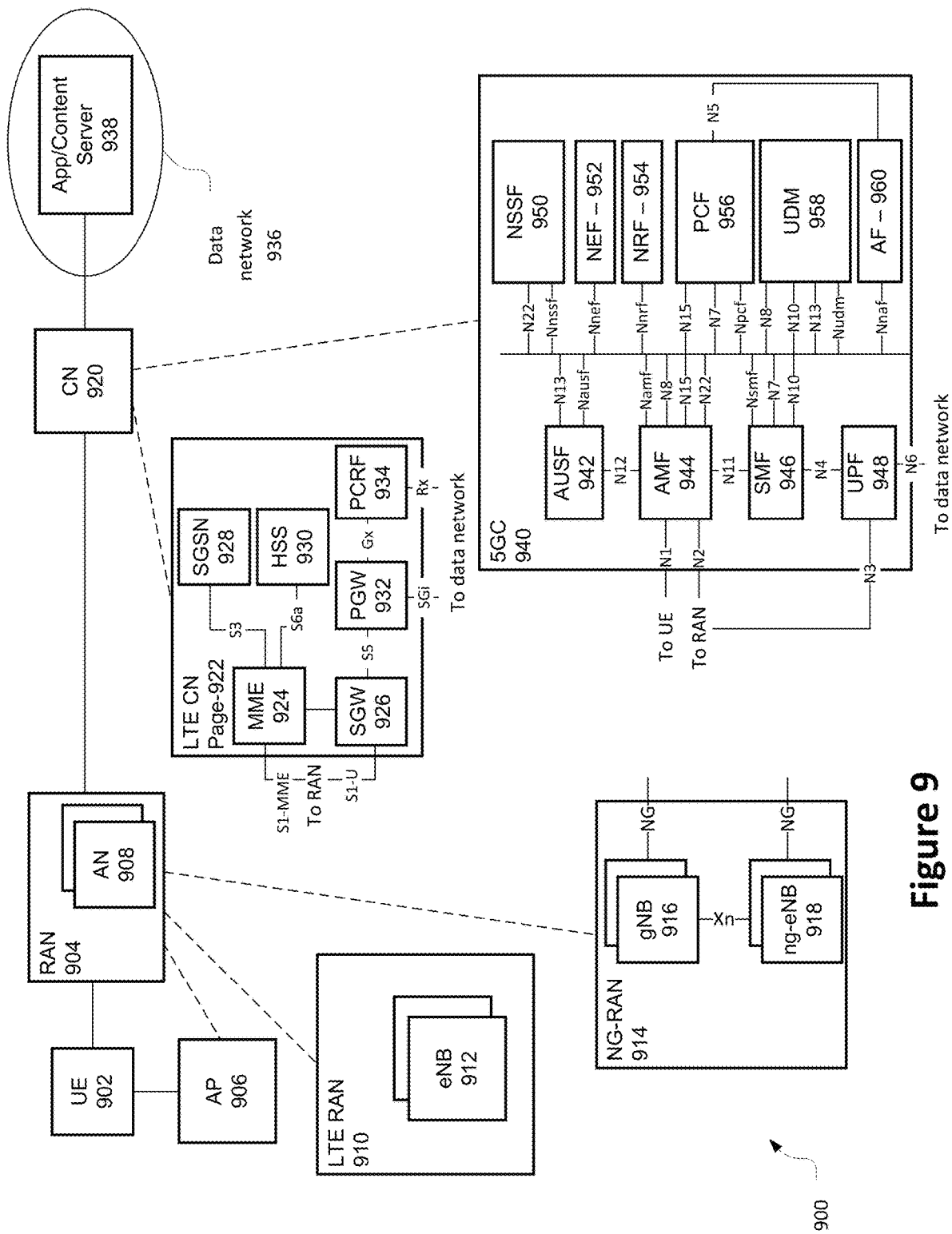
FIG. 9 illustrates a network in accordance with various embodiments.

FIG. 9 illustrates a network 900 in accordance with various embodiments. The network 900 may operate in a manner consistent with 3GPP technical specifications for LTE or 5G/NR systems. However, the example embodiments are not limited in this regard and the described embodiments may apply to other networks that benefit from the principles described herein, such as future 3GPP systems, or the like.

The network 900 may include a UE 902, which may include any mobile or non-mobile computing device designed to communicate with a RAN 904 via an over-the-air connection. The UE 902 may be, but is not limited to, a smartphone, tablet computer, wearable computer device, desktop computer, laptop computer, in-vehicle infotainment, in-car entertainment device, instrument cluster, head-up display device, onboard diagnostic device, dashtop mobile equipment, mobile data terminal, electronic engine management system, electronic/engine control unit, electronic/engine control module, embedded system, sensor, microcontroller, control module, engine management system, networked appliance, machine-type communication device, M2M or D2D device, IoT device, etc.

In some embodiments, the network 900 may include a plurality of UEs coupled directly with one another via a sidelink interface. The UEs may be M2M/D2D devices that communicate using physical sidelink channels such as, but not limited to, PSBCH, PSDCH, PSSCH, PSCCH, etc.

In some embodiments, the UE 902 may additionally communicate with an AP 906 via an over-the-air connection. The AP 906 may manage a WLAN connection, which may serve to offload some/all network traffic from the RAN 904. The connection between the UE 902 and the AP 906 may be consistent with any IEEE 802.11 protocol, wherein the AP 906 could be a wireless fidelity (Wi-Fi®) router. In some embodiments, the UE 902, RAN 904, and AP 906 may utilize cellular-WLAN aggregation (for example, LWA/LWIP). Cellular-WLAN aggregation may involve the UE 902 being configured by the RAN 904 to utilize both cellular radio resources and WLAN resources.

The RAN 904 may include one or more access nodes, for example, AN 908. AN 908 may terminate air-interface protocols for the UE 902 by providing access stratum protocols including RRC, PDCP, RLC, MAC, and L1 protocols. In this manner, the AN 908 may enable data/voice connectivity between CN 920 and the UE 902. In some embodiments, the AN 908 may be implemented in a discrete device or as one or more software entities running on server computers as part of, for example, a virtual network, which may be referred to as a CRAN or virtual baseband unit pool. The AN 908 be referred to as a BS, gNB, RAN node, eNB, NodeB, RSU, TRxP, TRP, etc. The AN 908 may be a macrocell base station or a low power base station for providing femtocells, picocells or other like cells having smaller coverage areas, smaller user capacity, or higher bandwidth compared to macrocells.

In embodiments in which the RAN 904 includes a plurality of ANs, they may be coupled with one another via an X2 interface (if the RAN 904 is an LTE RAN) or an Xn interface (if the RAN 904 is a 5G RAN). The X2/Xn interfaces, which may be separated into control/user plane interfaces in some embodiments, may allow the ANs to communicate information related to handovers, data/context transfers, mobility, load management, interference coordination, etc.

The ANs of the RAN 904 may each manage one or more cells, cell groups, component carriers, etc. to provide the UE 902 with air interface for network access. The UE 902 may be simultaneously connected with a plurality of cells provided by the same or different ANs of the RAN 904. For example, the UE 902 and RAN 904 may use carrier aggregation to allow the UE 902 to connect with a plurality of component carriers, each corresponding to a Pcell or Scell. In dual connectivity scenarios, a first AN may be a master node that provides an MCG and a second AN may be secondary node that provides an SCG. The first/second ANs may be any combination of eNB, gNB, ng-eNB, etc.

The RAN 904 may provide the air interface over a licensed spectrum or an unlicensed spectrum. To operate in the unlicensed spectrum, the nodes may use LAA, eLAA, and/or feLAA mechanisms based on CA technology with PCells/Scells. Prior to accessing the unlicensed spectrum, the nodes may perform medium/carrier-sensing operations based on, for example, a listen-before-talk (LBT) protocol.

In V2X scenarios the UE 902 or AN 908 may be or act as a RSU, which may refer to any transportation infrastructure entity used for V2X communications. An RSU may be implemented in or by a suitable AN or a stationary (or relatively stationary) UE. An RSU implemented in or by: a UE may be referred to as a "UE-type RSU"; an eNB may be referred to as an "eNB-type RSU"; a gNB may be referred to as a "gNB-type RSU"; and the like. In one example, an RSU is a computing device coupled with radio frequency circuitry located on a roadside that provides connectivity support to passing vehicle UEs. The RSU may also include internal data storage circuitry to store intersection map geometry, traffic statistics, media, as well as applications/software to sense and control ongoing vehicular and pedestrian traffic. The RSU may provide very low latency communications required for high speed events, such as crash avoidance, traffic warnings, and the like. Additionally or alternatively, the RSU may provide other cellular/WLAN communications services. The components of the RSU may be packaged in a weatherproof enclosure suitable for outdoor installation, and may include a network interface controller to provide a wired connection (e.g., Ethernet) to a traffic signal controller or a backhaul network.

In some embodiments, the RAN 904 may be an LTE RAN 908 with eNBs, for example, eNB 912. The LTE RAN 908 may provide an LTE air interface with the following characteristics: SCS of 15 kHz; CP-OFDM waveform for DL and SC-FDMA waveform for UL; turbo codes for data and TBCC for control; etc. The LTE air interface may rely on CSI-RS for CSI acquisition and beam management; PDSCH/PDCCH DMRS for PDSCH/PDCCH demodulation; and CRS for cell search and initial acquisition, channel quality measurements, and channel estimation for coherent demodulation/detection at the UE. The LTE air interface may operating on sub-6 GHz bands.

In some embodiments, the RAN 904 may be an NG-RAN 914 with gNBs, for example, gNB 916, or ng-eNBs, for example, ng-eNB 918. The gNB 916 may connect with 5G-enabled UEs using a 5G NR interface. The gNB 916 may connect with a 5G core through an NG interface, which may include an N2 interface or an N3 interface. The ng-eNB 918 may also connect with the 5G core through an NG interface, but may connect with a UE via an LTE air interface. The gNB 916 and the ng-eNB 918 may connect with each other over an Xn interface.

In some embodiments, the NG interface may be split into two parts, an NG user plane (NG-U) interface, which carries traffic data between the nodes of the NG-RAN 914 and a UPF 948 (e.g., N3 interface), and an NG control plane (NG-C) interface, which is a signaling interface between the nodes of the NG-RAN914 and an AMF 944 (e.g., N2 interface).

The NG-RAN 914 may provide a 5G-NR air interface with the following characteristics: variable SCS; CP-OFDM for DL, CP-OFDM and DFT-s-OFDM for UL; polar, repetition, simplex, and Reed-Muller codes for control and LDPC for data. The 5G-NR air interface may rely on CSI-RS, PDSCH/PDCCH DMRS similar to the LTE air interface. The 5G-NR air interface may not use a CRS, but may use PBCH DMRS for PBCH demodulation; PTRS for phase tracking for PDSCH; and tracking reference signal for time tracking. The 5G-NR air interface may operating on FR1 bands that include sub-6 GHz bands or FR2 bands that include bands from 24.25 GHz to 52.6 GHz. The 5G-NR air interface may include an SSB that is an area of a downlink resource grid that includes PSS/SSS/PBCH.

The RAN 904 is connected to CN 920 that includes network elements to provide various functions to support data and telecommunications services to customers/subscribers (for example, users of UE 902). The components of the CN 920 may be implemented in one physical node or separate physical nodes. In some embodiments, NFV may be utilized to virtualize any or all of the functions provided by the network elements of the CN 920 onto physical compute/storage resources in servers, switches, etc. A logical instantiation of the CN 920 may be referred to as a network slice, and a logical instantiation of a portion of the CN 920 may be referred to as a network sub-slice.

In some embodiments, the CN 920 may be an LTE CN 922, which may also be referred to as an EPC. The LTE CN 922 may include MME 924, SGW 926, SGSN 928, HSS 930, PGW 932, and PCRF 934 coupled with one another over interfaces (or "reference points") as shown. Functions of the elements of the LTE CN 922 may be briefly introduced as follows.

The MME 924 may implement mobility management functions to track a current location of the UE 902 to facilitate tracking, gateway selection, etc.

The SGW 926 may terminate an Si interface toward the RAN and route data packets between the RAN and the LTE CN 922. The SGW 926 may be a local mobility anchor point for inter-RAN node handovers and also may provide an anchor for inter-3GPP mobility. Other responsibilities may include lawful intercept, charging, and some policy enforcement.

The SGSN 928 may track a location of the UE 902 and perform security functions. In addition, the SGSN 928 may perform inter-EPC node signaling for mobility between different RAT networks; PDN and S-GW selection as specified by MME 924; MME selection for handovers; etc. The S3 reference point between the MME 924 and the SGSN 928 may enable user and bearer information exchange for inter-3GPP access network mobility in idle/active states.

The HSS 930 may include a database for network users, including subscription-related information to support the network entities' handling of communication sessions. The HSS 930 can provide support for routing/roaming, authentication, authorization, naming/addressing resolution, location dependencies, etc. An S6a reference point between the HSS 930 and the MME 924 may enable transfer of subscription and authentication data for authenticating/authorizing user access to the LTE CN 920.

The PGW 932 may terminate an SGi interface toward a data network 936 that may include an application/content server 938. The PGW 932 may route data packets between the LTE CN 922 and the data network 936. The S5 reference point between The PGW 932 may be coupled with the SGW 926 by an S5 reference point to facilitate user plane tunneling and tunnel management. The PGW 932 may further include a node for policy enforcement and charging data collection (for example, PCEF). Additionally, the SGi reference point between the PGW 932 and the data network 936 may be an operator external public, a private PDN, or an intra-operator packet data network, for example, for provision of IMS services. The PGW 932 may be coupled with a PCRF 934 via a Gx reference point.

The PCRF 934 is the policy and charging control element of the LTE CN 922. The PCRF 934 may be communicatively coupled to the app/content server 938 to determine appropriate QoS and charging parameters for service flows. The PCRF 932 may provision associated rules into a PCEF (via Gx reference point) with appropriate TFT and QCI.

In some embodiments, the CN 920 may be a 5GC 940. The 5GC 940 may include an AUSF 942, AMF 944, SMF 946, UPF 948, NSSF 950, NEF 952, NRF 954, PCF 956, UDM 958, and AF 960 coupled with one another over interfaces (or "reference points") as shown. Functions of the elements of the 5GC 940 may be briefly introduced as follows.

The AUSF 942 may store data for authentication of UE 902 and handle authentication-related functionality. The AUSF 942 may facilitate a common authentication framework for various access types. In addition to communicating with other elements of the 5GC 940 over reference points as shown, the AUSF 942 may exhibit an Nausf service-based interface.

The AMF 944 may allow other functions of the 5GC 940 to: communicate with the UE 902 and the RAN 904; and to subscribe to notifications about mobility events with respect to the UE 902. The AMF 944 may be responsible for registration management (for example, for registering UE 902), connection management, reachability management, mobility management, lawful interception of AMF-related events, and access authentication and authorization. The AMF 944 may provide transport for SM messages between the UE 902 and the SMF 946, and act as a transparent proxy for routing SM messages. AMF 944 may also provide transport for SMS messages between UE 902 and an SMSF. AMF 944 may interact with the AUSF 942 and the UE 902 to perform various security anchor and context management functions. Furthermore, AMF 944 may be a termination point of a RAN CP interface, which may include or be an N2 reference point between the RAN 904 and the AMF 944; and the AMF 944 may be a termination point of NAS (N1) signaling, and perform NAS ciphering and integrity protection. AMF 944 may also support NAS signaling with the UE 902 over an N3 IWF interface.

The SMF 946 may be responsible for SM (for example, session establishment, tunnel management between UPF 948 and AN 908); UE IP address allocation and management (including optional authorization); selection and control of UP function; configuring traffic steering at UPF 948 to route traffic to proper destination; termination of interfaces toward policy control functions; controlling part of policy enforcement, charging, and QoS; lawful intercept (for SM events and interface to LI system); termination of SM parts of NAS messages; downlink data notification; initiating AN specific SM information, sent via AMF over N2 to AN; and determining SSC mode of a session. SM may refer to management of a PDU session, and a PDU session or "session" may refer to a PDU connectivity service that provides or enables the exchange of PDUs between a UE 902 and the data network 936.

The UPF 948 may act as an anchor point for intra-RAT and inter-RAT mobility, an external PDU session point of interconnect to data network 936, and a branching point to support multi-homed PDU session. The UPF 948 may also perform packet routing and forwarding, perform packet inspection, enforce the user plane part of policy rules, lawfully intercept packets (UP collection), perform traffic usage reporting, perform QoS handling for a user plane (e.g., packet filtering, gating, UL/DL rate enforcement), perform Uplink Traffic verification (e.g., SDF-to-QoS flow mapping), transport level packet marking in the uplink and downlink, and perform downlink packet buffering and downlink data notification triggering. UPF 948 may include an uplink classifier to support routing traffic flows to a data network.

The NSSF 950 may select a set of network slice instances serving the UE 902. The NSSF 950 may also determine allowed NSSAI and the mapping to the subscribed S-NS-SAIs, if needed. The NSSF 950 may also determine the AMF set to be used to serve the UE 902, or a list of candidate AMF(s) based on a suitable configuration and possibly by querying the NRF 954. The selection of a set of network slice instances for the UE 902 may be triggered by the AMF 944 with which the UE 902 is registered by interacting with the NSSF 950, which may lead to a change of AMF. The NSSF 950 may interact with the AMF 944 via an N22 reference point; and may communicate with another NSSF in a visited network via an N31 reference point (not shown). Additionally, the NSSF 950 may exhibit an Nnssf service-based interface.

The NEF 952 may securely expose services and capabilities provided by 3GPP network functions for third party, internal exposure/re-exposure, Application Functions (e.g., AF 960), edge computing or fog computing systems, etc. In such embodiments, the NEF 952 may authenticate, authorize, or throttle the AFs. NEF 952 may also translate information exchanged with the AF 960 and information exchanged with internal network functions. For example, the NEF 952 may translate between an AF-Service-Identifier and an internal 5GC information. NEF 952 may also receive information from other NFs based on exposed capabilities of other NFs. This information may be stored at the NEF 952 as structured data, or at a data storage NF using standardized interfaces. The stored information can then be re-exposed by the NEF 952 to other NFs and AFs, or used for other purposes such as analytics. Additionally, the NEF 952 may exhibit an Nnef service-based interface.

The NRF 954 may support service discovery functions, receive NF discovery requests from NF instances, and provide the information of the discovered NF instances to the NF instances. NRF 954 also maintains information of available NF instances and their supported services. As used herein, the terms "instantiate," "instantiation," and the like may refer to the creation of an instance, and an "instance" may refer to a concrete occurrence of an object, which may occur, for example, during execution of program code. Additionally, the NRF 954 may exhibit the Nnrf service-based interface.

The PCF 956 may provide policy rules to control plane functions to enforce them, and may also support unified policy framework to govern network behavior. The PCF 956 may also implement a front end to access subscription information relevant for policy decisions in a UDR of the UDM 958. In addition to communicating with functions over reference points as shown, the PCF 956 exhibit an Npcf service-based interface.

The UDM 958 may handle subscription-related information to support the network entities' handling of communication sessions, and may store subscription data of UE 902. For example, subscription data may be communicated via an N8 reference point between the UDM 958 and the AMF 944. The UDM 958 may include two parts, an application front end and a UDR. The UDR may store subscription data and policy data for the UDM 958 and the PCF 956, and/or structured data for exposure and application data (including PFDs for application detection, application request information for multiple UEs 902) for the NEF 952. The Nudr service-based interface may be exhibited by the UDR 221 to allow the UDM 958, PCF 956, and NEF 952 to access a particular set of the stored data, as well as to read, update (e.g., add, modify), delete, and subscribe to notification of relevant data changes in the UDR. The UDM may include a UDM-FE, which is in charge of processing credentials, location management, subscription management and so on. Several different front ends may serve the same user in different transactions. The UDM-FE accesses subscription information stored in the UDR and performs authentication credential processing, user identification handling, access authorization, registration/mobility management, and subscription management. In addition to communicating with other NFs over reference points as shown, the UDM 958 may exhibit the Nudm service-based interface.

The AF 960 may provide application influence on traffic routing, provide access to the NCE, and interact with the policy framework for policy control. The NCE may be a mechanism that allows the 5GC 940 and AF 960 to provide information to each other via NEF 952, which may be used for edge computing implementations. In such implementations, the network operator and third party services may be hosted close to the UE 902 access point of attachment to achieve an efficient service delivery through the reduced end-to-end latency and load on the transport network. For edge computing implementations, the 5GC 940 may select a UPF 948 close to the UE 902 and execute traffic steering from the UPF 948 to data network 936 via the N6 interface. This may be based on the UE subscription data, UE location, and information provided by the AF 960. In this way, the AF 960 may influence UPF (re)selection and traffic routing.

Based on operator deployment, when AF 960 is considered to be a trusted entity, the network operator may permit AF 960 to interact directly with relevant NFs. Additionally, the AF 960 may exhibit an Naf service-based interface.

The data network 936 may represent various network operator services, Internet access, or third party services.

Figure 10:
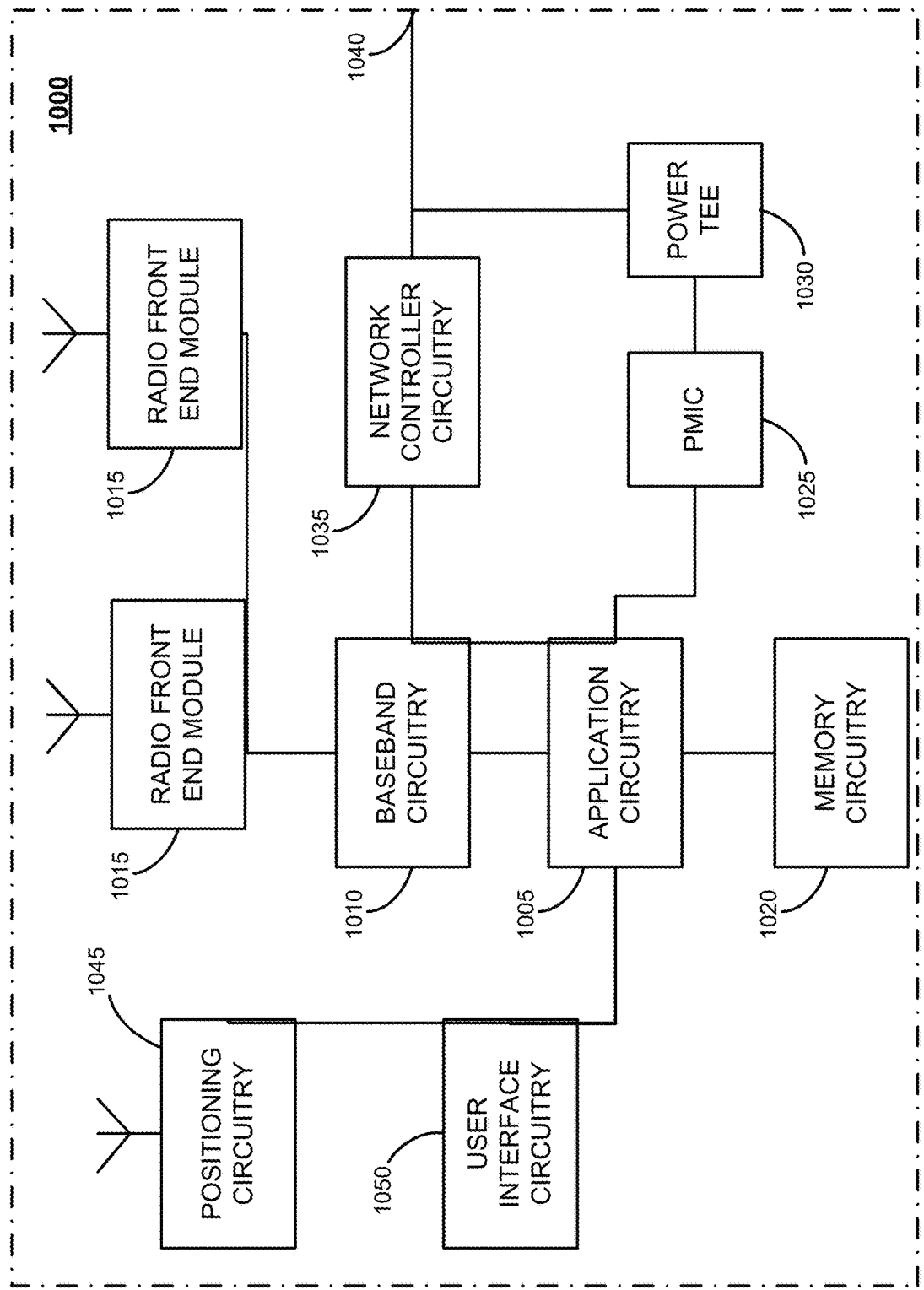
FIG. 10 illustrates an example of infrastructure equipment in accordance with various embodiments.

FIG. 10 illustrates an example of infrastructure equipment 1000 in accordance with various embodiments. The infrastructure equipment 1000 (or "system 1000") may be implemented as a base station, radio head, RAN node such as those shown and described previously, application server(s), and/or any other element/device discussed herein. In other examples, the system 1000 could be implemented in or by a UE.

The system 1000 includes application circuitry 1005, baseband circuitry 1010, one or more radio front end modules (RFEMs) 1015, memory circuitry 1020, power management integrated circuitry (PMIC) 1025, power tee circuitry 1030, network controller circuitry 1035, network interface connector 1040, satellite positioning circuitry 1045, and user interface 1050. In some embodiments, the device 1000 may include additional elements such as, for example, memory/storage, display, camera, sensor, or input/output (I/O) interface. In other embodiments, the components described below may be included in more than one device. For example, said circuitries may be separately included in more than one device for CRAN, vBBU, or other like implementations.

Application circuitry 1005 includes circuitry such as, but not limited to one or more processors (or processor cores), cache memory, and one or more of low drop-out voltage regulators (LDOs), interrupt controllers, serial interfaces such as SPI, I2C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 1005 may be coupled with or may include memory/storage elements and may be configured to execute instructions stored in the memory/storage to enable various applications or operating systems to run on the system 1000. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 1005 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof. In some embodiments, the application circuitry 1005 may comprise, or may be, a special-purpose processor/controller to operate according to the various embodiments herein. As examples, the processor(s) of application circuitry 1005 may include one or more Intel Pentium®, Core®, or Xeon® processor(s); Advanced Micro Devices (AMD) Ryzen® processor(s), Accelerated Processing Units (APUs), or Epyc® processors;

ARM-based processor(s) licensed from ARM Holdings, Ltd. such as the ARM Cortex-A family of processors and the ThunderX2® provided by Cavium™, Inc.; a MIPS-based design from MIPS Technologies, Inc. such as MIPS Warrior P-class processors; and/or the like. In some embodiments, the system 1000 may not utilize application circuitry 1005, and instead may include a special-purpose processor/controller to process IP data received from an EPC or 5GC, for example.

In some implementations, the application circuitry 1005 may include one or more hardware accelerators, which may be microprocessors, programmable processing devices, or the like. The one or more hardware accelerators may include, for example, computer vision (CV) and/or deep learning (DL) accelerators. As examples, the programmable processing devices may be one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such implementations, the circuitry of application circuitry 1005 may comprise logic blocks or logic fabric, and other interconnected resources that may be programmed to perform various functions, such as the procedures, methods, functions, etc. of the various embodiments discussed herein. In such embodiments, the circuitry of application circuitry 1005 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up-tables (LUTs) and the like.

The baseband circuitry 1010 may be implemented, for example, as a solder-down substrate including one or more integrated circuits, a single packaged integrated circuit soldered to a main circuit board or a multi-chip module containing two or more integrated circuits. The various hardware electronic elements of baseband circuitry 1010 are discussed infra with regard to FIG. 12.

User interface circuitry 1050 may include one or more user interfaces designed to enable user interaction with the system 1000 or peripheral component interfaces designed to enable peripheral component interaction with the system 1000. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The radio front end modules (RFEMs) 1015 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays (see e.g., antenna array 1211 of FIG. 12 infra), and the RFEM may be connected to multiple antennas. In alternative implementations, both mmWave and sub-mmWave radio functions may be implemented in the same physical RFEM 1015, which incorporates both mmWave antennas and sub-mmWave.

The memory circuitry 1020 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. Memory circuitry 1020 may be implemented as one or more of solder down packaged integrated circuits, socketed memory modules and plug-in memory cards.

The PMIC 1025 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 1030 may provide for electrical power drawn from a network cable to provide both power supply and data connectivity to the infrastructure equipment 1000 using a single cable.

The network controller circuitry 1035 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 1000 via network interface connector 1040 using a physical connection, which may be electrical (commonly referred to as a "copper interconnect"), optical, or wireless. The network controller circuitry 1035 may include one or more dedicated processors and/or FPGAs to communicate using one or more of the aforementioned protocols. In some implementations, the network controller circuitry 1035 may include multiple controllers to provide connectivity to other networks using the same or different protocols.

The positioning circuitry 1045 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 1045 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 1045 may include a Micro-Technology for Positioning, Navigation, and Timing (Micro-PNT) IC that uses a master timing clock to perform position tracking/estimation without GNSS assistance. The positioning circuitry 1045 may also be part of, or interact with, the baseband circuitry 1010 and/or RFEMs 1015 to communicate with the nodes and components of the positioning network. The positioning circuitry 1045 may also provide position data and/or time data to the application circuitry 1005, which may use the data to synchronize operations with various infrastructure (e.g., RAN nodes, etc.), or the like.

The components shown by FIG. 10 may communicate with one another using interface circuitry, which may include any number of bus and/or interconnect (IX) technologies such as industry standard architecture (ISA), extended ISA (EISA), peripheral component interconnect (PCI), peripheral component interconnect extended (PCIx), PCI express (PCIe), or any number of other technologies. The bus/IX may be a proprietary bus, for example, used in a SoC based system. Other bus/IX systems may be included, such as an I²C interface, an SPI interface, point to point interfaces, and a power bus, among others.

Figure 11:
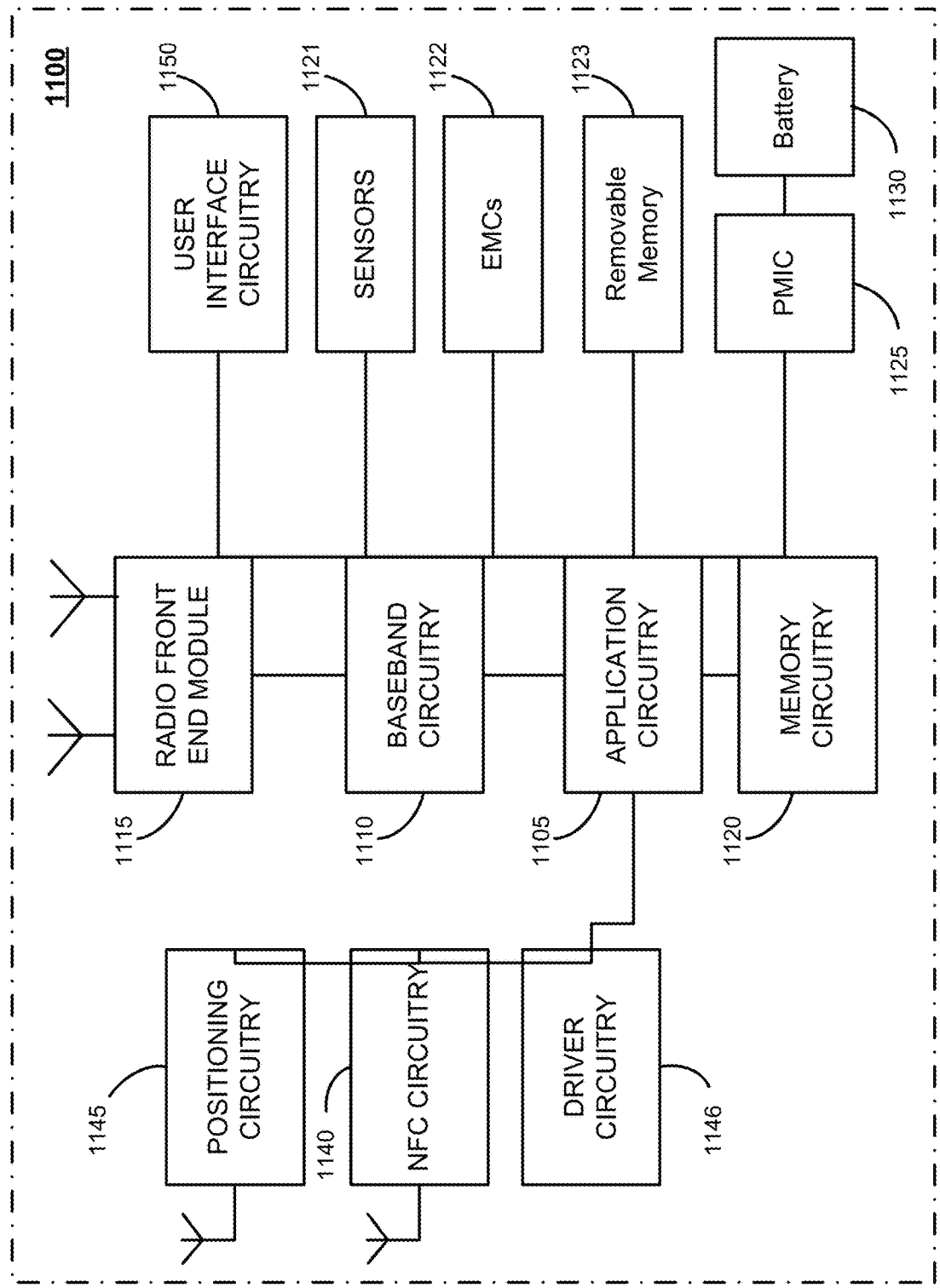
FIG. 11 illustrates an example of a computer platform in accordance with various embodiments.

FIG. 11 illustrates an example of a platform 1100 (or "device 1100") in accordance with various embodiments. In embodiments, the computer platform 1100 may be suitable for use as UE (e.g., UE 902), application servers, and/or any other element/device discussed herein. The platform 1100 may include any combinations of the components shown in the example. The components of platform 1100 may be implemented as integrated circuits (ICs), portions thereof, discrete electronic devices, or other modules, logic, hardware, software, firmware, or a combination thereof adapted in the computer platform 1100, or as components otherwise incorporated within a chassis of a larger system. The block diagram of FIG. 11 is intended to show a high level view of components of the computer platform 1100. However, some of the components shown may be omitted, additional components may be present, and different arrangement of the components shown may occur in other implementations.

Application circuitry 1105 includes circuitry such as, but not limited to one or more processors (or processor cores), cache memory, and one or more of LDOs, interrupt controllers, serial interfaces such as SPI, I2C or universal programmable serial interface module, RTC, timer-counters including interval and watchdog timers, general purpose I/O, memory card controllers such as SD MMC or similar, USB interfaces, MIPI interfaces, and JTAG test access ports. The processors (or cores) of the application circuitry 1105 may be coupled with or may include memory/storage elements and may be configured to execute instructions stored in the memory/storage to enable various applications or operating systems to run on the system 1100. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 1005 may include, for example, one or more processor cores, one or more application processors, one or more GPUs, one or more RISC processors, one or more ARM processors, one or more CISC processors, one or more DSP, one or more FPGAs, one or more PLDs, one or more ASICs, one or more microprocessors or controllers, a multithreaded processor, an ultra-low voltage processor, an embedded processor, some other known processing element, or any suitable combination thereof. In some embodiments, the application circuitry 1005 may comprise, or may be, a special-purpose processor/controller to operate according to the various embodiments herein.

As examples, the processor(s) of application circuitry 1105 may include an Intel® Architecture Core™ based processor, such as a Quark™, an Atom™, an i3, an i5, an i7, or an MCU-class processor, or another such processor available from Intel® Corporation, Santa Clara, Calif. The processors of the application circuitry 1105 may also be one or more of Advanced Micro Devices (AMD) Ryzen® processor(s) or Accelerated Processing Units (APUs); A5-A9 processor(s) from Apple® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; or the like. In some implementations, the application circuitry 1105 may be a part of a system on a chip (SoC) in which the application circuitry 1105 and other components are formed into a single integrated circuit, or a single package, such as the Edison™ or Galileo™ SoC boards from Intel® Corporation.

Additionally or alternatively, application circuitry 1105 may include circuitry such as, but not limited to, one or more a field-programmable devices (FPDs) such as FPGAs and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 1105 may comprise logic blocks or logic fabric, and other interconnected resources that may be programmed to perform various functions, such as the procedures, methods, functions, etc. of the various embodiments discussed herein. In such embodiments, the circuitry of application circuitry 1105 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up tables (LUTs) and the like.

The baseband circuitry 1110 may be implemented, for example, as a solder-down substrate including one or more integrated circuits, a single packaged integrated circuit soldered to a main circuit board or a multi-chip module containing two or more integrated circuits. The various hardware electronic elements of baseband circuitry 1110 are discussed infra with regard to FIG. 12.

The RFEMs 1115 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays (see e.g., antenna array 1211 of FIG. 12 infra), and the RFEM may be connected to multiple antennas. In alternative implementations, both mmWave and sub-mmWave radio functions may be implemented in the same physical RFEM 1115, which incorporates both mmWave antennas and sub-mmWave.

The memory circuitry 1120 may include any number and type of memory devices used to provide for a given amount of system memory. As examples, the memory circuitry 1120 may include one or more of volatile memory including random access memory (RAM), dynamic RAM (DRAM) and/or synchronous dynamic RAM (SDRAM), and nonvolatile memory (NVM) including high-speed electrically erasable memory (commonly referred to as Flash memory), phase change random access memory (PRAM), magnetoresistive random access memory (MRAM), etc. The memory circuitry 1120 may be developed in accordance with a Joint Electron Devices Engineering Council (JEDEC) low power double data rate (LPDDR)-based design, such as LPDDR2, LPDDR3, LPDDR4, or the like. Memory circuitry 1120 may be implemented as one or more of solder down packaged integrated circuits, single die package (SDP), dual die package (DDP) or quad die package (Q17P), socketed memory modules, dual inline memory modules (DIMMs) including microDIMMs or MiniDIMMs, and/or soldered onto a motherboard via a ball grid array (BGA). In low power implementations, the memory circuitry 1120 may be on-die memory or registers associated with the application circuitry 1105. To provide for persistent storage of information such as data, applications, operating systems and so forth, memory circuitry 1120 may include one or more mass storage devices, which may include, inter alia, a solid state disk drive (SSDD), hard disk drive (HDD), a micro HDD, resistance change memories, phase change memories, holographic memories, or chemical memories, among others. For example, the computer platform 1100 may incorporate the three-dimensional (3D) cross-point (XPOINT) memories from Intel® and Micron®.

Removable memory circuitry 1123 may include devices, circuitry, enclosures/housings, ports or receptacles, etc. used to couple portable data storage devices with the platform 1100. These portable data storage devices may be used for mass storage purposes, and may include, for example, flash memory cards (e.g., Secure Digital (SD) cards, microSD cards, xD picture cards, and the like), and USB flash drives, optical discs, external HDDs, and the like.

The platform 1100 may also include interface circuitry (not shown) that is used to connect external devices with the platform 1100. The external devices connected to the platform 1100 via the interface circuitry include sensor circuitry 1121 and electro-mechanical components (EMCs) 1122, as well as removable memory devices coupled to removable memory circuitry 1123.

The sensor circuitry 1121 include devices, modules, or subsystems whose purpose is to detect events or changes in its environment and send the information (sensor data) about the detected events to some other a device, module, subsystem, etc. Examples of such sensors include, inter alia, inertia measurement units (IMUS) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras or lensless apertures); light detection and ranging (LiDAR) sensors; proximity sensors (e.g., infrared radiation detector and the like), depth sensors, ambient light sensors, ultrasonic transceivers; microphones or other like audio capture devices; etc.

EMCs 1122 include devices, modules, or subsystems whose purpose is to enable platform 1100 to change its state, position, and/or orientation, or move or control a mechanism or (sub)system. Additionally, EMCs 1122 may be configured to generate and send messages/signalling to other components of the platform 1100 to indicate a current state of the EMCs 1122. Examples of the EMCs 1122 include one or more power switches, relays including electromechanical relays (EMRs) and/or solid state relays (SSRs), actuators (e.g., valve actuators, etc.), an audible sound generator, a visual warning device, motors (e.g., DC motors, stepper motors, etc.), wheels, thrusters, propellers, claws, clamps, hooks, and/or other like electro-mechanical components. In embodiments, platform 1100 is configured to operate one or more EMCs 1122 based on one or more captured events and/or instructions or control signals received from a service provider and/or various clients.

In some implementations, the interface circuitry may connect the platform 1100 with positioning circuitry 1145. The positioning circuitry 1145 includes circuitry to receive and decode signals transmitted/broadcasted by a positioning network of a GNSS. Examples of navigation satellite constellations (or GNSS) include United States' GPS, Russia's GLONASS, the European Union's Galileo system, China's BeiDou Navigation Satellite System, a regional navigation system or GNSS augmentation system (e.g., NAVIC), Japan's QZSS, France's DORIS, etc.), or the like. The positioning circuitry 1145 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 1145 may include a Micro-PNT IC that uses a master timing clock to perform position tracking/estimation without GNSS assistance. The positioning circuitry 1145 may also be part of, or interact with, the baseband circuitry 1010 and/or RFEMs 1115 to communicate with the nodes and components of the positioning network. The positioning circuitry 1145 may also provide position data and/or time data to the application circuitry 1105, which may use the data to synchronize operations with various infrastructure (e.g., radio base stations), for turn-by-turn navigation applications, or the like In some implementations, the interface circuitry may connect the platform 1100 with Near-Field Communication (NFC) circuitry 1140. NFC circuitry 1140 is configured to provide contactless, short-range communications based on radio frequency identification (RFID) standards, wherein magnetic field induction is used to enable communication between NFC circuitry 1140 and NFC-enabled devices external to the platform 1100 (e.g., an "NFC touchpoint"). NFC circuitry 1140 comprises an NFC controller coupled with an antenna element and a processor coupled with the NFC controller. The NFC controller may be a chip/IC providing NFC functionalities to the NFC circuitry 1140 by executing NFC controller firmware and an NFC stack. The NFC stack may be executed by the processor to control the NFC controller, and the NFC controller firmware may be executed by the NFC controller to control the antenna element to emit short-range RF signals. The RF signals may power a passive NFC tag (e.g., a microchip embedded in a sticker or wristband) to transmit stored data to the NFC circuitry 1140, or initiate data transfer between the NFC circuitry 1140 and another active NFC device (e.g., a smartphone or an NFC-enabled POS terminal) that is proximate to the platform 1100.

The driver circuitry 1146 may include software and hardware elements that operate to control particular devices that are embedded in the platform 1100, attached to the platform 1100, or otherwise communicatively coupled with the platform 1100. The driver circuitry 1146 may include individual drivers allowing other components of the platform 1100 to interact with or control various input/output (I/O) devices that may be present within, or connected to, the platform 1100. For example, driver circuitry 1146 may include a display driver to control and allow access to a display device, a touchscreen driver to control and allow access to a touchscreen interface of the platform 1100, sensor drivers to obtain sensor readings of sensor circuitry 1121 and control and allow access to sensor circuitry 1121, EMC drivers to obtain actuator positions of the EMCs 1122 and/or control and allow access to the EMCs 1122, a camera driver to control and allow access to an embedded image capture device, audio drivers to control and allow access to one or more audio devices.

The power management integrated circuitry (PMIC) 1125 (also referred to as "power management circuitry 1125") may manage power provided to various components of the platform 1100. In particular, with respect to the baseband circuitry 1110, the PMIC 1125 may control power-source selection, voltage scaling, battery charging, or DC-to-DC conversion. The PMIC 1125 may often be included when the platform 1100 is capable of being powered by a battery 1130, for example, when the device is included in a UE 902, XR101, XR201.

In some embodiments, the PMIC 1125 may control, or otherwise be part of, various power saving mechanisms of the platform 1100. For example, if the platform 1100 is in an RRC_Connected state, where it is still connected to the RAN node as it expects to receive traffic shortly, then it may enter a state known as Discontinuous Reception Mode (DRX) after a period of inactivity. During this state, the platform 1100 may power down for brief intervals of time and thus save power. If there is no data traffic activity for an extended period of time, then the platform 1100 may transition off to an RRC_Idle state, where it disconnects from the network and does not perform operations such as channel quality feedback, handover, etc. The platform 1100 goes into a very low power state and it performs paging where again it periodically wakes up to listen to the network and then powers down again. The platform 1100 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 1130 may power the platform 1100, although in some examples the platform 1100 may be mounted deployed in a fixed location, and may have a power supply coupled to an electrical grid. The battery 1130 may be a lithium ion battery, a metal-air battery, such as a zinc-air battery, an aluminum-air battery, a lithium-air battery, and the like. In some implementations, such as in V2X applications, the battery 1130 may be a typical lead-acid automotive battery.

In some implementations, the battery 1130 may be a "smart battery," which includes or is coupled with a Battery Management System (BMS) or battery monitoring integrated circuitry. The BMS may be included in the platform 1100 to track the state of charge (SoCh) of the battery 1130. The BMS may be used to monitor other parameters of the battery 1130 to provide failure predictions, such as the state of health (SoH) and the state of function (SoF) of the battery 1130. The BMS may communicate the information of the battery 1130 to the application circuitry 1105 or other components of the platform 1100. The BMS may also include an analog-to-digital (ADC) convertor that allows the application circuitry 1105 to directly monitor the voltage of the battery 1130 or the current flow from the battery 1130. The battery parameters may be used to determine actions that the platform 1100 may perform, such as transmission frequency, network operation, sensing frequency, and the like.

A power block, or other power supply coupled to an electrical grid may be coupled with the BMS to charge the battery 1130. In some examples, the power block XS30 may be replaced with a wireless power receiver to obtain the power wirelessly, for example, through a loop antenna in the computer platform 1100. In these examples, a wireless battery charging circuit may be included in the BMS. The specific charging circuits chosen may depend on the size of the battery 1130, and thus, the current required. The charging may be performed using the Airfuel standard promulgated by the Airfuel Alliance, the Qi wireless charging standard promulgated by the Wireless Power Consortium, or the Rezence charging standard promulgated by the Alliance for Wireless Power, among others.

User interface circuitry 1150 includes various input/output (I/O) devices present within, or connected to, the platform 1100, and includes one or more user interfaces designed to enable user interaction with the platform 1100 and/or peripheral component interfaces designed to enable peripheral component interaction with the platform 1100. The user interface circuitry 1150 includes input device circuitry and output device circuitry. Input device circuitry includes any physical or virtual means for accepting an input including, inter alia, one or more physical or virtual buttons (e.g., a reset button), a physical keyboard, keypad, mouse, touchpad, touchscreen, microphones, scanner, headset, and/or the like. The output device circuitry includes any physical or virtual means for showing information or otherwise conveying information, such as sensor readings, actuator position(s), or other like information. Output device circuitry may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the platform 1100. The output device circuitry may also include speakers or other audio emitting devices, printer(s), and/or the like. In some embodiments, the sensor circuitry 1121 may be used as the input device circuitry (e.g., an image capture device, motion capture device, or the like) and one or more EMCs may be used as the output device circuitry (e.g., an actuator to provide haptic feedback or the like). In another example, NFC circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc.

Although not shown, the components of platform 1100 may communicate with one another using a suitable bus or interconnect (IX) technology, which may include any number of technologies, including ISA, EISA, PCI, PCIx, PCIe, a Time-Trigger Protocol (TTP) system, a FlexRay system, or any number of other technologies. The bus/IX may be a proprietary bus/IX, for example, used in a SoC based system. Other bus/IX systems may be included, such as an I$^2$C interface, an SPI interface, point-to-point interfaces, and a power bus, among others.

Figure 12:
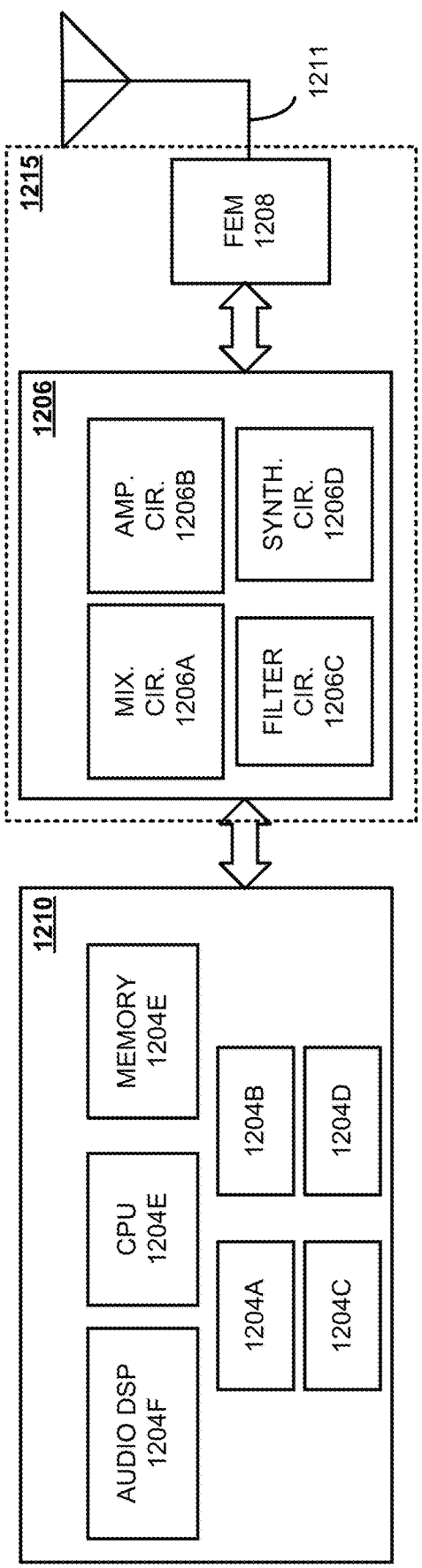
FIG. 12 illustrates example components of baseband circuitry and radio front end modules in accordance with various embodiments.

FIG. 12 illustrates example components of baseband circuitry 1210 and radio front end modules (RFEM) 1215 in accordance with various embodiments. The baseband circuitry 1210 corresponds to the baseband circuitry 1010 and 1110 of FIGS. 10 and 11, respectively. The RFEM 1215 corresponds to the RFEM 1015 and 1115 of FIGS. 10 and 11, respectively. As shown, the RFEMs 1215 may include Radio Frequency (RF) circuitry 1206, front-end module (FEM) circuitry 1208, antenna array 1211 coupled together at least as shown.

The baseband circuitry 1210 includes circuitry and/or control logic configured to carry out various radio/network protocol and radio control functions that enable communication with one or more radio networks via the RF circuitry 1206. The radio control functions may include, but are not limited to, signal modulation/demodulation, encoding/decoding, radio frequency shifting, etc. In some embodiments, modulation/demodulation circuitry of the baseband circuitry 1210 may include Fast-Fourier Transform (FFT), precoding, or constellation mapping/demapping functionality. In some embodiments, encoding/decoding circuitry of the baseband circuitry 1210 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments. The baseband circuitry 1210 is configured to process baseband signals received from a receive signal path of the RF circuitry 1206 and to generate baseband signals for a transmit signal path of the RF circuitry 1206. The baseband circuitry 1210 is configured to interface with application circuitry 1005/1105 (see FIGS. 10 and 11) for generation and processing of the baseband signals and for controlling operations of the RF circuitry 1206. The baseband circuitry 1210 may handle various radio control functions.

The aforementioned circuitry and/or control logic of the baseband circuitry 1210 may include one or more single or multi-core processors. For example, the one or more processors may include a 3G baseband processor 1204A, a 4G/LTE baseband processor 1204B, a 5G/NR baseband processor 1204C, or some other baseband processor(s) 1204D for other existing generations, generations in development or to be developed in the future (e.g., sixth generation (6G), etc.). In other embodiments, some or all of the functionality of baseband processors 1204A-D may be included in modules stored in the memory 1204G and executed via a Central Processing Unit (CPU) 1204E. In other embodiments, some or all of the functionality of baseband processors 1204A-D may be provided as hardware accelerators (e.g., FPGAs, ASICs, etc.) loaded with the appropriate bit streams or logic blocks stored in respective memory cells. In various embodiments, the memory 1204G may store program code of a real-time OS (RTOS), which when executed by the CPU 1204E (or other baseband processor), is to cause the CPU 1204E (or other baseband processor) to manage resources of the baseband circuitry 1210, schedule tasks, etc. Examples of the RTOS may include Operating System Embedded (OSE)™ provided by Enea®, Nucleus RTOS™ provided by Mentor Graphics®, Versatile Real-Time Executive (VRTX) provided by Mentor Graphics®, ThreadX™ provided by Express Logic®, FreeRTOS, REX OS provided by Qualcomm®, OKL4 provided by Open Kernel (OK) Labs®, or any other suitable RTOS, such as those discussed herein. In addition, the baseband circuitry 1210 includes one or more audio digital signal processor(s) (DSP) 1204F. The audio DSP(s) 1204F include elements for compression/decompression and echo cancellation and may include other suitable processing elements in other embodiments.

In some embodiments, each of the processors 1204A-1204E include respective memory interfaces to send/receive data to/from the memory 1204G. The baseband circuitry 1210 may further include one or more interfaces to communicatively couple to other circuitries/devices, such as an interface to send/receive data to/from memory external to the baseband circuitry 1210; an application circuitry interface to send/receive data to/from the application circuitry 1005/1105 of FIGS. 10-XT); an RF circuitry interface to send/receive data to/from RF circuitry 1206 of FIG. 12; a wireless hardware connectivity interface to send/receive data to/from one or more wireless hardware elements (e.g., Near Field Communication (NFC) components, Bluetooth®/Bluetooth® Low Energy components, Wi-Fi® components, and/or the like); and a power management interface to send/receive power or control signals to/from the PMIC 1125.

In alternate embodiments (which may be combined with the above described embodiments), baseband circuitry 1210 comprises one or more digital baseband systems, which are coupled with one another via an interconnect subsystem and to a CPU subsystem, an audio subsystem, and an interface subsystem. The digital baseband subsystems may also be coupled to a digital baseband interface and a mixed-signal baseband subsystem via another interconnect subsystem. Each of the interconnect subsystems may include a bus system, point-to-point connections, network-on-chip (NOC) structures, and/or some other suitable bus or interconnect technology, such as those discussed herein. The audio subsystem may include DSP circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 1210 may include protocol processing circuitry with one or more instances of control circuitry (not shown) to provide control functions for the digital baseband circuitry and/or radio frequency circuitry (e.g., the radio front end modules 1215).

Although not shown by FIG. 12, in some embodiments, the baseband circuitry 1210 includes individual processing device(s) to operate one or more wireless communication protocols (e.g., a "multi-protocol baseband processor" or "protocol processing circuitry") and individual processing device(s) to implement PHY layer functions. In these embodiments, the PHY layer functions include the aforementioned radio control functions. In these embodiments, the protocol processing circuitry operates or implements various protocol layers/entities of one or more wireless communication protocols. In a first example, the protocol processing circuitry may operate LTE protocol entities and/or 5G/NR protocol entities when the baseband circuitry 1210 and/or RF circuitry 1206 are part of mmWave communication circuitry or some other suitable cellular communication circuitry. In the first example, the protocol processing circuitry would operate MAC, RLC, PDCP, SDAP, RRC, and NAS functions. In a second example, the protocol processing circuitry may operate one or more IEEE-based protocols when the baseband circuitry 1210 and/or RF circuitry 1206 are part of a Wi-Fi communication system. In the second example, the protocol processing circuitry would operate Wi-Fi MAC and logical link control (LLC) functions. The protocol processing circuitry may include one or more memory structures (e.g., 1204G) to store program code and data for operating the protocol functions, as well as one or more processing cores to execute the program code and perform various operations using the data. The baseband circuitry 1210 may also support radio communications for more than one wireless protocol.

The various hardware elements of the baseband circuitry 1210 discussed herein may be implemented, for example, as a solder-down substrate including one or more integrated circuits (ICs), a single packaged IC soldered to a main circuit board or a multi-chip module containing two or more ICs. In one example, the components of the baseband circuitry 1210 may be suitably combined in a single chip or chipset, or disposed on a same circuit board. In another example, some or all of the constituent components of the baseband circuitry 1210 and RF circuitry 1206 may be implemented together such as, for example, a system on a chip (SoC) or System-in-Package (SiP). In another example, some or all of the constituent components of the baseband circuitry 1210 may be implemented as a separate SoC that is communicatively coupled with and RF circuitry 1206 (or multiple instances of RF circuitry 1206). In yet another example, some or all of the constituent components of the baseband circuitry 1210 and the application circuitry 1005/1105 may be implemented together as individual SoCs mounted to a same circuit board (e.g., a "multi-chip package").

In some embodiments, the baseband circuitry 1210 may provide for communication compatible with one or more radio technologies. For example, in some embodiments, baseband circuitry 1210 may support communication with an E-UTRAN or other WMAN, a WLAN, a WPAN. Embodiments in which the baseband circuitry 1210 is configured to support radio communications of more than one wireless protocol may be referred to as multi-mode baseband circuitry.

RF circuitry 1206 may enable communication with wireless networks using modulated electromagnetic radiation through a non-solid medium. In various embodiments, the RF circuitry 1206 may include switches, filters, amplifiers, etc. to facilitate the communication with the wireless network. RF circuitry 1206 may include a receive signal path, which may include circuitry to down-convert RF signals received from the FEM circuitry 1208 and provide baseband signals to the baseband circuitry 1210. RF circuitry 1206 may also include a transmit signal path, which may include circuitry to up-convert baseband signals provided by the baseband circuitry 1210 and provide RF output signals to the FEM circuitry 1208 for transmission.

In some embodiments, the receive signal path of the RF circuitry 1206 may include mixer circuitry 1206a, amplifier circuitry 1206b and filter circuitry 1206c. In some embodiments, the transmit signal path of the RF circuitry 1206 may include filter circuitry 1206c and mixer circuitry 1206a. RF circuitry 1206 may also include synthesizer circuitry 1206d for synthesizing a frequency for use by the mixer circuitry 1206a of the receive signal path and the transmit signal path. In some embodiments, the mixer circuitry 1206a of the receive signal path may be configured to down-convert RF signals received from the FEM circuitry 1208 based on the synthesized frequency provided by synthesizer circuitry 1206d. The amplifier circuitry 1206b may be configured to amplify the down-converted signals and the filter circuitry 1206c may be a low-pass filter (LPF) or band-pass filter (BPF) configured to remove unwanted signals from the down-converted signals to generate output baseband signals. Output baseband signals may be provided to the baseband circuitry 1210 for further processing. In some embodiments, the output baseband signals may be zero-frequency baseband signals, although this is not a requirement. In some embodiments, mixer circuitry 1206a of the receive signal path may comprise passive mixers, although the scope of the embodiments is not limited in this respect.

In some embodiments, the mixer circuitry 1206a of the transmit signal path may be configured to up-convert input baseband signals based on the synthesized frequency provided by the synthesizer circuitry 1206d to generate RF output signals for the FEM circuitry 1208. The baseband signals may be provided by the baseband circuitry 1210 and may be filtered by filter circuitry 1206c.

In some embodiments, the mixer circuitry 1206a of the receive signal path and the mixer circuitry 1206a of the transmit signal path may include two or more mixers and may be arranged for quadrature downconversion and upconversion, respectively. In some embodiments, the mixer circuitry 1206a of the receive signal path and the mixer circuitry 1206a of the transmit signal path may include two or more mixers and may be arranged for image rejection (e.g., Hartley image rejection). In some embodiments, the mixer circuitry 1206a of the receive signal path and the mixer circuitry 1206a of the transmit signal path may be arranged for direct downconversion and direct upconversion, respectively. In some embodiments, the mixer circuitry 1206a of the receive signal path and the mixer circuitry 1206a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1206 may include analog-to-digital converter (ADC) and digital-to-analog converter (DAC) circuitry and the baseband circuitry 1210 may include a digital baseband interface to communicate with the RF circuitry 1206.

In some dual-mode embodiments, a separate radio IC circuitry may be provided for processing signals for each spectrum, although the scope of the embodiments is not limited in this respect.

In some embodiments, the synthesizer circuitry 1206d may be a fractional-N synthesizer or a fractional N/N+1 synthesizer, although the scope of the embodiments is not limited in this respect as other types of frequency synthesizers may be suitable. For example, synthesizer circuitry 1206d may be a delta-sigma synthesizer, a frequency multiplier, or a synthesizer comprising a phase-locked loop with a frequency divider.

The synthesizer circuitry 1206d may be configured to synthesize an output frequency for use by the mixer circuitry 1206a of the RF circuitry 1206 based on a frequency input and a divider control input. In some embodiments, the synthesizer circuitry 1206d may be a fractional N/N+1 synthesizer.

In some embodiments, frequency input may be provided by a voltage controlled oscillator (VCO), although that is not a requirement. Divider control input may be provided by either the baseband circuitry 1210 or the application circuitry 1005/1105 depending on the desired output frequency. In some embodiments, a divider control input (e.g., N) may be determined from a look-up table based on a channel indicated by the application circuitry 1005/1105.

Synthesizer circuitry 1206d of the RF circuitry 1206 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1206d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1206 may include an IQ/polar converter.

FEM circuitry 1208 may include a receive signal path, which may include circuitry configured to operate on RF signals received from antenna array 1211, amplify the received signals and provide the amplified versions of the received signals to the RF circuitry 1206 for further processing. FEM circuitry 1208 may also include a transmit signal path, which may include circuitry configured to amplify signals for transmission provided by the RF circuitry 1206 for transmission by one or more of antenna elements of antenna array 1211. In various embodiments, the amplification through the transmit or receive signal paths may be done solely in the RF circuitry 1206, solely in the FEM circuitry 1208, or in both the RF circuitry 1206 and the FEM circuitry 1208.

In some embodiments, the FEM circuitry 1208 may include a TX/RX switch to switch between transmit mode and receive mode operation. The FEM circuitry 1208 may include a receive signal path and a transmit signal path. The receive signal path of the FEM circuitry 1208 may include an LNA to amplify received RF signals and provide the amplified received RF signals as an output (e.g., to the RF circuitry 1206). The transmit signal path of the FEM circuitry 1208 may include a power amplifier (PA) to amplify input RF signals (e.g., provided by RF circuitry 1206), and one or more filters to generate RF signals for subsequent transmission by one or more antenna elements of the antenna array 1211.

The antenna array 1211 comprises one or more antenna elements, each of which is configured convert electrical signals into radio waves to travel through the air and to convert received radio waves into electrical signals. For example, digital baseband signals provided by the baseband circuitry 1210 is converted into analog RF signals (e.g., modulated waveform) that will be amplified and transmitted via the antenna elements of the antenna array 1211 including one or more antenna elements (not shown). The antenna elements may be omnidirectional, direction, or a combination thereof. The antenna elements may be formed in a multitude of arranges as are known and/or discussed herein. The antenna array 1211 may comprise microstrip antennas or printed antennas that are fabricated on the surface of one or more printed circuit boards. The antenna array 1211 may be formed in as a patch of metal foil (e.g., a patch antenna) in a variety of shapes, and may be coupled with the RF circuitry 1206 and/or FEM circuitry 1208 using metal transmission lines or the like.

Processors of the application circuitry 1005/1105 and processors of the baseband circuitry 1210 may be used to execute elements of one or more instances of a protocol stack. For example, processors of the baseband circuitry 1210, alone or in combination, may be used execute Layer 3, Layer 2, or Layer 1 functionality, while processors of the application circuitry 1005/1105 may utilize data (e.g., packet data) received from these layers and further execute Layer 4 functionality (e.g., TCP and UDP layers). As referred to herein, Layer 3 may comprise a RRC layer, described in further detail below. As referred to herein, Layer 2 may comprise a MAC layer, an RLC layer, and a PDCP layer, described in further detail below. As referred to herein, Layer 1 may comprise a PHY layer of a UE/RAN node, described in further detail below.

Figure 13:
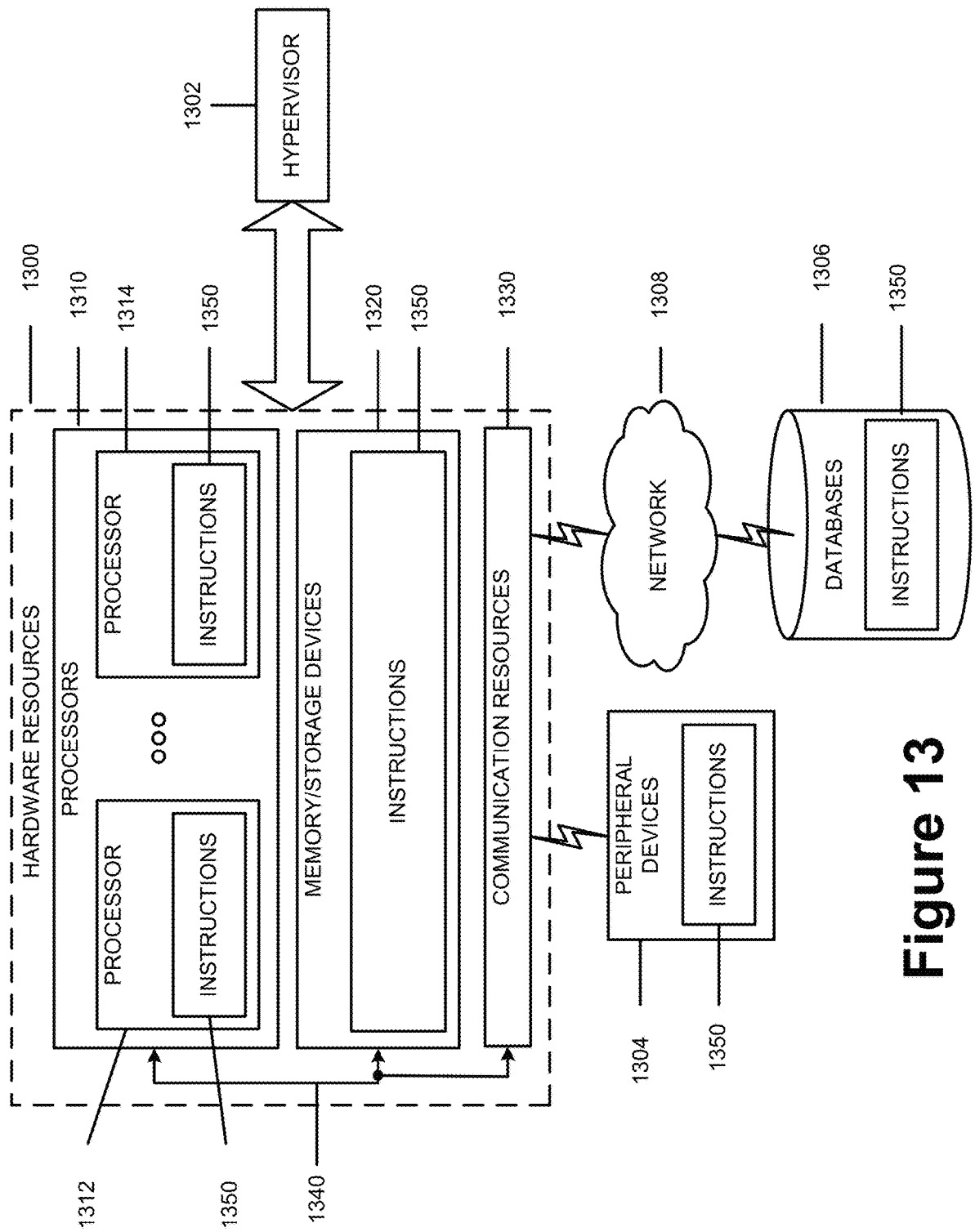
FIG. 13 is a block diagram illustrating components, according to some example embodiments, able to read instructions from a machine-readable or computer-readable medium (e.g., a non-transitory machine-readable storage medium) and perform any one or more of the methodologies discussed herein.

FIG. 13 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 13 shows a diagrammatic representation of hardware resources 1300 including one or more processors (or processor cores) 1310, one or more memory/storage devices 1320, and one or more communication resources 1330, each of which may be communicatively coupled via a bus 1340. For embodiments where node virtualization (e.g., NFV) is utilized, a hypervisor 1302 may be executed to provide an execution environment for one or more network slices/sub-slices to utilize the hardware resources 1300.

The processors 1310 may include, for example, a processor 1312 and a processor 1314. The processor(s) 1310 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 1320 may include main memory, disk storage, or any suitable combination thereof. The memory/storage devices 1320 may include, but are not limited to, any type of volatile or nonvolatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 1330 may include interconnection or network interface components or other suitable devices to communicate with one or more peripheral devices 1304 or one or more databases 1306 via a network 1308. For example, the communication resources 1330 may include wired communication components (e.g., for coupling via USB), cellular communication components, NFC components, Bluetooth® (or Bluetooth® Low Energy) components, Wi-Fi® components, and other communication components.

Instructions 1350 may comprise software, a program, an application, an applet, an app, or other executable code for causing at least any of the processors 1310 to perform any one or more of the methodologies discussed herein. The instructions 1350 may reside, completely or partially, within at least one of the processors 1310 (e.g., within the processor's cache memory), the memory/storage devices 1320, or any suitable combination thereof. Furthermore, any portion of the instructions 1350 may be transferred to the hardware resources 1300 from any combination of the peripheral devices 1304 or the databases 1306. Accordingly, the memory of processors 1310, the memory/storage devices 1320, the peripheral devices 1304, and the databases 1306 are examples of computer-readable and machine-readable media.

Example Procedures

Figure 7:
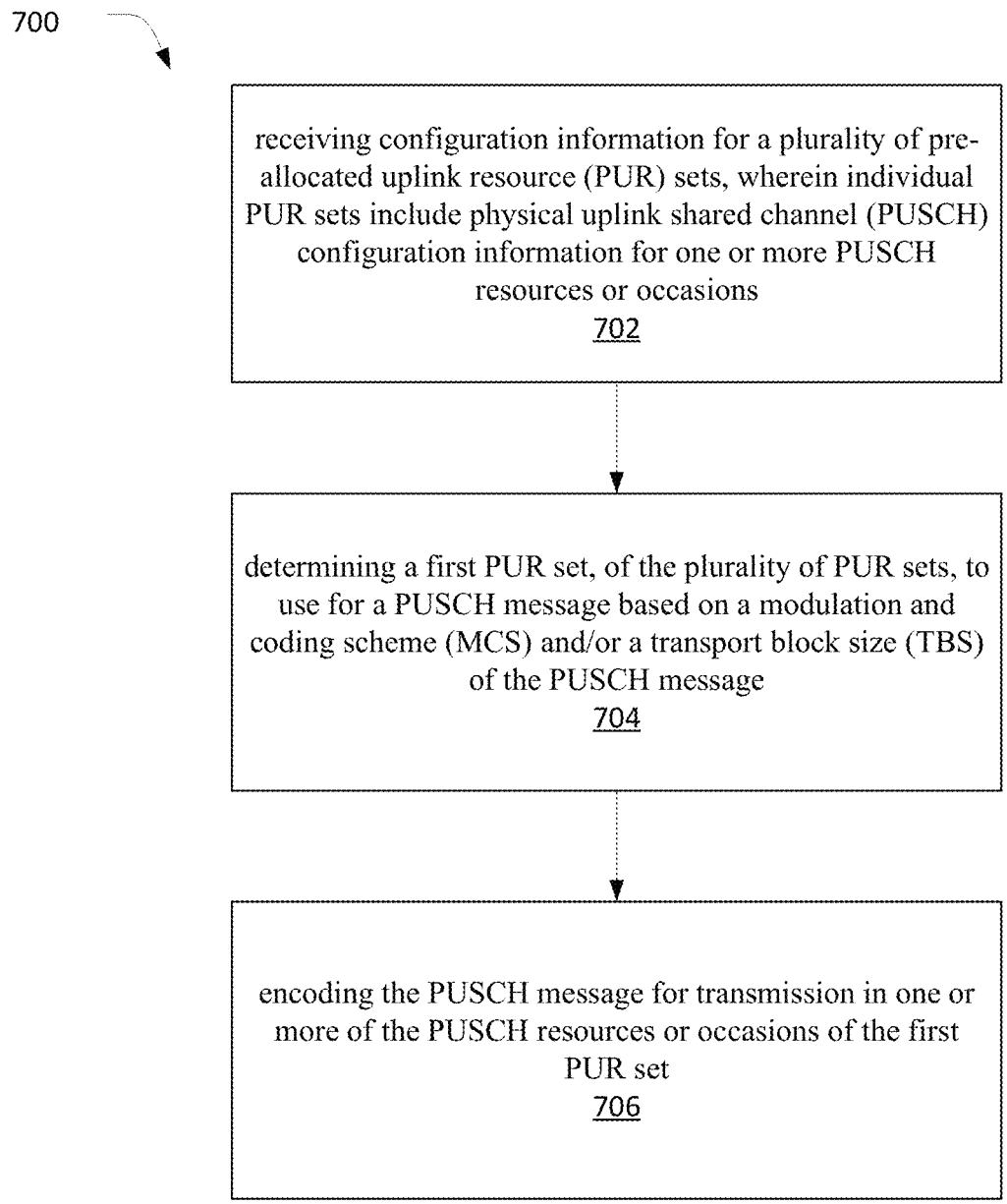
FIG. 7 illustrates a process in accordance with various embodiments.

In some embodiments, the electronic device(s), network(s), system(s), chip(s) or component(s), or portions or implementations thereof, of FIGS. 9-13, or some other figure herein, may be configured to perform one or more processes, techniques, or methods as described herein, or portions thereof. One such process 700 is depicted in FIG. 7. In some embodiments, the process 700 may be performed by a UE or a portion thereof.

For example, the process 700 may include, at 702, receiving configuration information for a plurality of pre-allocated uplink resource (PUR) sets, wherein individual PUR sets include physical uplink shared channel (PUSCH) configuration information for one or more PUSCH resources or occasions.

At 704, the process 700 may further include determining a first PUR set, of the plurality of PUR sets, to use for a PUSCH message based on a modulation and coding scheme (MCS) and/or a transport block size (TBS) of the PUSCH message. At 706, the process 700 may further include encoding the PUSCH message for transmission in one or more of the PUSCH resources or occasions of the first PUR set.

Figure 8:
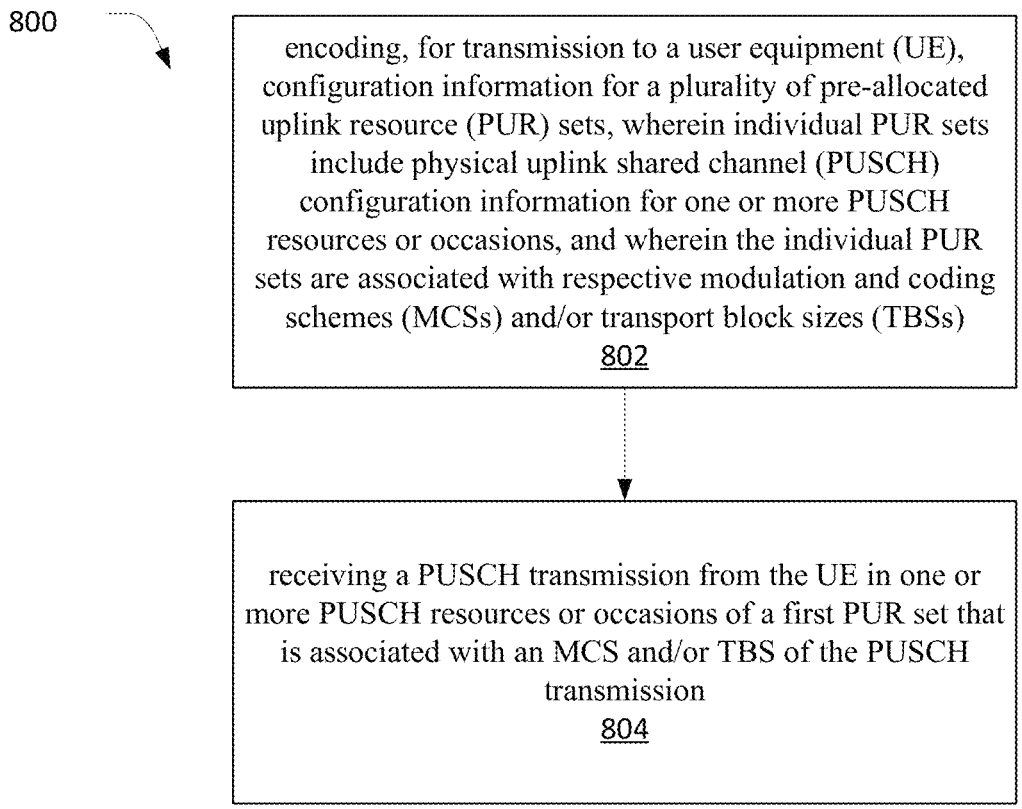
FIG. 8 illustrates another process in accordance with various embodiments.

FIG. 8 illustrates another process 800 in accordance with various embodiments. In some embodiments, the process 800 may be performed by a next generation NodeB or a portion thereof. At 802, the process 800 may include encoding, for transmission to a user equipment (UE), configuration information for a plurality of pre-allocated uplink resource (PUR) sets, wherein individual PUR sets include physical uplink shared channel (PUSCH) configuration information for one or more PUSCH resources or occasions, and wherein the individual PUR sets are associated with respective modulation and coding schemes (MCSs) and/or transport block sizes (TBSs).

At 804, the process 800 may further include receiving a PUSCH transmission from the UE in one or more PUSCH resources or occasions of a first PUR set that is associated with an MCS and/or TBS of the PUSCH transmission.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

Example 1 may include a method of wireless communication for a fifth generation (5G) or new radio (NR) system, the method comprising:
determining, by a UE, a Pre-allocated UL resource (PUR) set in accordance with modulation and coding scheme (MCS) and/or transport block size (TBS) of data transmission;

determining, by the UE, a physical uplink shared channel (PUSCH) resource/occasion from the determined PUR set in accordance with association between the PUSCH resource/occasion and Synchronization signal block (SSB).

selecting, by the UE, randomly a PUSCH resource unit within the determined PUSCH resource/occasion on which to transmit a PUSCH.

Example 2 may include the method of example 1 or some other example herein, wherein multiple sets of pre-allocated UL resources (PUR) may be configured by higher layers via NR minimum system information (MSI), NR remaining minimum system information (RMSI), NR other system information (OSI) or radio resource control (RRC) signalling Example 3 may include the method of example 1 or some other example herein, wherein one PUR set may be configured for one specific transport block size (TB S) and/or modulation and coding scheme (MCS).

Example 4 may include the method of example 1 or some other example herein, wherein within a PUR set, multiple PUSCH resources or PUSCH occasions may be configured;

Example 5 may include the method of example 1 or some other example herein, wherein for one PUSCH resource or occasion, the following parameters may be configured: time domain resource allocation; frequency domain resource allocation, numerology, waveform, Demodulation reference signal (DMRS) related configuration, HARQ related parameters, indication on whether uplink control information (UCI) is piggybacked on PUSCH transmission.

Example 6 may include the method of example 1 or some other example herein, wherein to indicate the MCS or TBS or different PUR set for PUSCH transmission, uplink control information (UCI) may be piggybacked on PUSCH, where the UCI is used to carry information regarding MCS or TBS of corresponding PUSCH transmission.

Example 7 may include the method of example 1 or some other example herein, wherein when PUSCH with different MCS or TBS are transmitted in a same time and frequency resource, DMRS index partitioning may be used to indicate the MCS or TBS of corresponding PUSCH transmission.

Example 8 may include the method of example 1 or some other example herein, wherein for TDD system or unpaired spectrum, if semi-static TDD DL UL configuration is configured, transmission occasion of PUSCH may only occupy UL or flexible symbol within a slot.

Example 9 may include the method of example 1 or some other example herein, wherein PUSCH may not be transmitted within a gap after DL symbols or SSB or may not be transmitted prior to SSB in a slot Example 10 may include the method of example 1 or some other example herein, wherein a PUSCH resource unit may be defined as one PUSCH resource unit and DMRS antenna port (AP) and/or DMRS sequence.

Example 11 may include the method of example 1 or some other example herein, wherein certain PUSCH resource units within a PUSCH resource/occasion may be configured as contention based PUSCH resource unit, while the remaining PUSCH resource units may be configured as contention free PUSCH resource unit Example 12 may include the method of example 1 or some other example herein, wherein for a PUR set, if multiple PUSCH resources/occasions in a slot are configured, the PUSCH resource unit can be ordered as follows: First, in increasing order of DMRS port and/or sequence within a single PUSCH resource/occasion; Second, in increasing order of frequency resource indexes for frequency multiplexed PUSCH resources/occasions; Third, in increasing order of time resource indexes for time multiplexed PUSCH resources/occasions within an PUSCH slot; Fourth, in increasing order of indexes for PUSCH slots Example 13 may include the method of example 1 or some other example herein, wherein one or more SSB may be associated with one or more PUSCH resource/occasion per a PUR set.

Example 14 may include the method of example 1 or some other example herein, wherein If N<1, one SS/PBCH block is mapped to 1/N consecutive valid PUSCH resource/occasion, wherein R PUSCH resource units with consecutive indexes associated with the SS/PBCH block per valid PUSCH resource/occasion start from PUSCH resource unit index 0; wherein a number N of SS/PBCH blocks are associated with one PUSCH resource/occasion and a number R of PUSCH resource unit is configured per SS/PBCH block per valid PUSCH resource/occasion Example 15 may include the method of example 1 or some other example herein, wherein If N≥1, R contention based preambles with consecutive indexes associated with SS/PBCH block n, 0≤n≤N−1, per valid PUSCH resource/occasion start from preamble index $n \cdot N_{PRU}^{total}/N$ where $N_{PRU}^{total}$ is the number of PUSCH resource units for a PUSCH resource/occasion for contention based PUSCH only transmission and is an integer multiple of N Example 16 may include the method of example 1, wherein the scrambling sequence for PUSCH only transmission carrying small data may be initialized as a function of SSB index, DMRS index and/or configurable ID.

Example 17 may include the method of example 1 or some other example herein, when PUSCH resource in PUR set overlaps in time and frequency with any 4-step or 2-step RACH occasions, PUSCH resource in PUR set is invalid Example 18 may include the method of example 1 or some other example herein, wherein timing advance (TA) of 0 is applied for PUR based PUSCH transmission.

Example 19 may include the method of example 1 or some other example herein, wherein for RRC_INACTIVE state UEs, UE can be configured with srs-ResourceIndicator to indicate which SRS resource is used for PUSCH transmission Example 20 is a method of a user equipment, the method comprising:
receiving configuration information for a plurality of pre-allocated uplink resource (PUR) sets, wherein individual PUR sets include physical uplink shared channel (PUSCH) configuration information for one or more PUSCH resources or occasions;
determining a first PUR set, of the plurality of PUR sets, to use for a PUSCH transmission based on a modulation and coding scheme (MCS) and/or a transport block size (TBS) of the PUSCH transmission; and transmitting or causing to transmit the PUSCH transmission in one or more of the PUSCH resources or occasions of the first PUR set.

Example 21 is the method of example 20 or another example herein, further comprising determining a first resource/occasion from the determined first PUR set based on a synchronization signal block (SSB), wherein the data transmission is performed on the determined first PUSCH resource/occasion.

Example 22 is the method of example 21 or another example herein, wherein SSBs are associated with respective resources/occasions based on one or more of:
in increasing or decreasing order of a frequency resource index for frequency multiplexed PUSCH resources or occasions;
in increasing or decreasing order of a demodulation reference signal (DMRS) index within a same PUSCH resource or occasion;
in increasing or decreasing order of a time resource index for time multiplexed PUSCH resources or occasions within a PUSCH slot; and
in increasing or decreasing order of an index of the PUSCH slot.

Example 23 is the method of example 21 or another example herein, wherein SSBs are associated with respective resources/occasions as follows:
first, in increasing order of a frequency resource index for frequency multiplexed PUSCH resources or occasions;
second in increasing order of a demodulation reference signal (DMRS) index within a same PUSCH resource or occasion;
third, in increasing order of a time resource index for time multiplexed PUSCH resources or occasions within a PUSCH slot; and
fourth, in increasing order of an index of the PUSCH slot.

Example 24 is the method of example 21 or another example herein, wherein SSBs are associated with respective resources/occasions based on one or more of:
in increasing or decreasing order of a frequency resource index for frequency multiplexed PUSCH resources or occasions;
in increasing or decreasing order of DMRS indexes within a single PUSCH occasion; and
in increasing or decreasing order of a slot index for respective PUSCH slots.

Example 25 is the method of example 21 or another example herein, wherein SSBs are associated with respective resources/occasions as follows:
first, in increasing order of a frequency resource index for frequency multiplexed PUSCH resources or occasions;
second, in increasing order of DMRS indexes within a single PUSCH occasion; and
third, in increasing order of a slot index for respective PUSCH slots.

Example 26 is the method of example 22-25 or another example herein, wherein the DMRS indexes are first ordered by a DMRS antenna port and then ordered by a DMRS sequence index.

Example 27 is the method of example 22-25 or another example herein, wherein the DMRS indexes are first ordered by a DMRS sequence index and then ordered by a DMRS antenna port.

Example 28 is the method of example 20-27 or another example herein, wherein the configuration information is received via NR minimum system information (MSI) signaling, NR remaining minimum system information (RMSI) signaling, NR other system information (OSI) signaling, or radio resource control (RRC) signaling.

Example 29 is the method of example 20-28 or some other example herein, wherein individual PUR sets of the plurality of PUR sets are associated with respective individual TBSs and/or MCSs.

Example 30 may include the method of example 20-29 or some other example herein, wherein one or more PUR sets of the plurality of PUR sets include multiple PUSCH resources or PUSCH occasions.

Example 31 may include the method of example 20-30 or some other example herein, wherein the PUSCH configuration information includes one or more of: time domain resource allocation; frequency domain resource allocation; numerology; waveform; Demodulation reference signal (DMRS) related configuration; HARQ related parameters;

or an indication of whether uplink control information (UCI) is piggybacked on PUSCH transmission.

Example 32 may include the method of example 20-31, further comprising transmitting or causing to transmit uplink control information (UCI) in the PUSCH transmission to indicate the MCS, TBS, and/or PUR set used for transmission of the PUSCH.

Example 33 may include the method of example 20-32 or some other example herein, further comprising performing DMRS partitioning between the PUSCH transmission and another PUSCH that is transmitted with different MCS or TBS in a same time and frequency resource, to indicate the MCS or TBS of the corresponding PUSCH transmission.

Example 34 may include the method of example 20-33 or some other example herein, further comprising determining a TDD DL-UL configuration of a cell or BWP on which the PUSCH is to be transmitted; and transmitting or causing to transmit the PUSCH in UL or flexible symbols within a slot based on the TDD DL-UL configuration.

Example 35 may include the method of example 20-34 or some other example herein, further comprising that a PUSCH resource or occasion of the first PUR set is not to be used for the PUSCH transmission if the PUSCH resource or occasion is within a gap after DL symbols or SSB, and/or prior to SSB in a slot.

Example 36 may include the method of example 20-35 or some other example herein, further comprising determining a scrambling sequence for the PUSCH transmission based on an SSB index, a DMRS index and/or a configurable ID.

Example 37 may include the method of example 20-36 or some other example herein, wherein the method is performed while the UE is in a RRC_IDLE or a RRC_INACTIVE state.

Example 38 may include the method of example 20-36 or some other example herein, wherein the method is performed while the UE is in an RRC_CONNECTED state.

Example 39 is a method of a next generation Node B (gNB), the method comprising:
transmitting or causing to transmit, to a UE, configuration information for a plurality of pre-allocated uplink resource (PUR) sets, wherein individual PUR sets include physical uplink shared channel (PUSCH) configuration information for one or more PUSCH resources or occasions, and wherein the individual PUR sets are associated with respective modulation and coding schemes (MCSs) and/or transport block sizes (TBSs); and
receiving a PUSCH transmission from the UE in one or more PUSCH resources or occasions of a first PUR set that is associated with an MCS and/or TBS of the PUSCH transmission.

Example 40 is the method of example 39 or another example herein, wherein the PUSCH transmission is received in a first resource/occasion of the first PUR set that is associated with a synchronization signal block (SSB) of the gNB.

Example 41 is the method of example 40 or another example herein, wherein SSBs are associated with respective resources/occasions based on one or more of:
in increasing or decreasing order of a frequency resource index for frequency multiplexed PUSCH resources or occasions;
in increasing or decreasing order of a demodulation reference signal (DMRS) index within a same PUSCH resource or occasion;
in increasing or decreasing order of a time resource index for time multiplexed PUSCH resources or occasions within a PUSCH slot; and
in increasing or decreasing order of an index of the PUSCH slot.

Example 42 is the method of example 40 or another example herein, wherein SSBs are associated with respective resources/occasions as follows:
first, in increasing order of a frequency resource index for frequency multiplexed PUSCH resources or occasions;
second in increasing order of a demodulation reference signal (DMRS) index within a same PUSCH resource or occasion;
third, in increasing order of a time resource index for time multiplexed PUSCH resources or occasions within a PUSCH slot; and
fourth, in increasing order of an index of the PUSCH slot.

Example 43 is the method of example 40 or another example herein, wherein SSBs are associated with respective resources/occasions based on one or more of:
in increasing or decreasing order of a frequency resource index for frequency multiplexed PUSCH resources or occasions;
in increasing or decreasing order of DMRS indexes within a single PUSCH occasion;
and in increasing or decreasing order of a slot index for respective PUSCH slots.

Example 44 is the method of example 40 or another example herein, wherein SSBs are associated with respective resources/occasions as follows:
first, in increasing order of a frequency resource index for frequency multiplexed PUSCH resources or occasions;
second, in increasing order of DMRS indexes within a single PUSCH occasion; and
third, in increasing order of a slot index for respective PUSCH slots.

Example 45 is the method of example 41-44 or another example herein, wherein the DMRS indexes are first ordered by a DMRS antenna port and then ordered by a DMRS sequence index.

Example 46 is the method of example 41-44 or another example herein, wherein the DMRS indexes are first ordered by a DMRS sequence index and then ordered by a DMRS antenna port.

Example 47 is the method of example 39-46 or another example herein, wherein the configuration information is transmitted via NR minimum system information (MSI) signaling, NR remaining minimum system information (RMSI) signaling, NR other system information (OSI) signaling, or radio resource control (RRC) signaling.

Example 48 is the method of example 39-47 or some other example herein, wherein individual PUR sets of the plurality of PUR sets are associated with respective individual TBSs and/or MCSs.

Example 49 may include the method of example 39-48 or some other example herein, wherein one or more PUR sets of the plurality of PUR sets include multiple PUSCH resources or PUSCH occasions.

Example 50 may include the method of example 39-49 or some other example herein, wherein the PUSCH configuration information includes one or more of: time domain resource allocation; frequency domain resource allocation; numerology; waveform; Demodulation reference signal (DMRS) related configuration; HARQ related parameters; or an indication of whether uplink control information (UCI) is piggybacked on PUSCH transmission.

Example 51 may include the method of example 39-50, further comprising receiving uplink control information (UCI) in the PUSCH transmission to indicate the MCS, TBS, and/or PUR set used for transmission of the PUSCH.

Example 52 may include the method of example 39-51 or some other example herein, further comprising identifying the MCS or TBS of the PUSCH transmission based on DMRS partitioning between the PUSCH transmission and another PUSCH that is transmitted with different MCS or TBS in a same time and frequency resource.

Example 53 may include the method of example 39-52 or some other example herein, further comprising determining a scrambling sequence for the PUSCH transmission based on an SSB index, a DMRS index and/or a configurable ID.

Example 54 may include the method of example 39-53 or some other example herein, wherein the UE is in a RRC_IDLE or a RRC_INACTIVE state with the gNB.

Example 55 may include the method of example 39-53 or some other example herein, wherein the UE is in an RRC_CONNECTED state with the gNB.

Example 56 may include a method comprising: determining a PUSCH resource in a PUR set overlaps in time and frequency with a 4-step or 2-step RACH occasion; and determining the PUSCH resource in the PUR set is invalid (for example, not available for a PUSCH transmission) based on the determination.

Example 57 may include a method comprising: determining whether uplink control information can be multiplexed on a physical uplink shared channel (PUSCH); and encoding a higher layer signal that includes an indication of the determination.

Example 58 may include the method of example 57, wherein the higher layer signal includes a medium access control (MAC) signal or a radio resource control (RRC) signal.

Example 59 may include the method of example 57-58 or some other example herein, wherein the indication indicates that the UCI can be multiplexed on the PUSCH in the method further comprises processing the PUSCH with multiplexed UCI.

Example 60 may include the method of example 59 or some other example herein, wherein the UCI includes information regarding MCS, TBS, or PUR set of the PUSCH.

Example 61 may include a method comprising: decoding a higher layer signal that includes an indication of whether UCI can be multiplexed on PUSCH; and encoding a PUSCH based on the indication.

Example 62 may include the method of example 61, wherein the higher layer signal includes a medium access control (MAC) signal or a radio resource control (RRC) signal.

Example 63 may include the method of example 61-62 or some other example herein, wherein the indication indicates that the UCI can be multiplexed on the PUSCH in the method further comprises multiplexing UCI on the PUSCH.

Example 64 may include the method of example 63 or some other example herein, wherein the UCI includes information regarding MCS, TBS, or PUR set of the PUSCH.

Example 65 may include a method comprising: determining that a PUCCH overlaps in time with a PUSCH for a PUR-based transmission within a PUCCH group; and dropping the PUCCH or PUSCH based on the determination.

Example 66 may include the method of example 65 or some other example herein, wherein the method comprises dropping the PUSCH for the PUR-based transmission and transmitting the PUCCH.

Example 67 may include the method of example 65 or some other example herein, wherein the method comprises dropping the PUCCH and transmitting the PUSCH.

Example 68 may include a method comprising: generating a PUR-based PUSCH transmission for small data; and encoding the PUR-based PUSCH transmission for transmission using redundancy version 0.

Example 69 pay include the method of example 68 or some other example herein, wherein the PUR-based PUSCH transmission is an initial transmission or a retransmission.

Example 70 may include a method comprising: generating configuration information that is to configure a UE with a SRS resource indicator to indicate which SRS resource is to be used for a PUSCH transmission; and encoding the configuration information for transmission to the UE.

Example 71 may include the method of example 70 or some other example herein, wherein the indicator is a srs-ResourceIndicator.

Example 72 may include the method of example 70 or some other example herein, wherein the UE is an RRC_INACTIVE state UE.

Example 73 may include a method comprising: generating PUSCH for PUR-based transmission; and encoding the PUSCH with a timing advance of 0.

Example 74 may include the method of example 73 or some other example herein, wherein the transmission is by an RRC_inactive or RRC_idle state UE.

Example 75 may include a method of operating a UE, the method comprising: determining a PUR set in accordance with MCS/TBS of a data transmission; determining a PUSCH resource/occasion from the PUR set; and transmitting a PUSCH on the PUSCH resource/occasion in accordance with an SRS resource indicator.

Example 76 may include the method of example 75 or some other example herein, wherein the PUR set is configured for small data transmission by an RRC_inactive state UE.

Example 77 may include a method comprising: processing configuration information that is to configure a UE with a SRS resource indicator to indicate which SRS resource is to be used for a PUSCH; and encoding the PUSCH for transmission using the indicated SRS resource.

Example 78 may include the method of example 77 or some other example herein, wherein the indicator is a srs-ResourceIndicator.

Example 79 may include the method of example 77 or some other example herein, wherein the UE is an RRC_INACTIVE state UE.

Example 80 may include the method of example 77-79 or some other example herein, wherein the method is performed by the UE or a portion thereof.

Example 81 may include a method comprising processing a transmission of a PUSCH for PUR-based transmission with a timing advance of 0.

Example 82 may include the method of example 81 or some other example herein, wherein the transmission is received from an RRC_inactive or RRC_idle state UE.

Example 83 may include an apparatus comprising means to perform one or more elements of a method described in or related to any of examples 1-82, or any other method or process described herein.

Example 84 may include one or more non-transitory computer-readable media comprising instructions to cause an electronic device, upon execution of the instructions by one or more processors of the electronic device, to perform one or more elements of a method described in or related to any of examples 1-82, or any other method or process described herein.

Example 85 may include an apparatus comprising logic, modules, or circuitry to perform one or more elements of a method described in or related to any of examples 1-82, or any other method or process described herein.

Example 86 may include a method, technique, or process as described in or related to any of examples 1-82, or portions or parts thereof.

Example 87 may include an apparatus comprising: one or more processors and one or more computer-readable media comprising instructions that, when executed by the one or more processors, cause the one or more processors to perform the method, techniques, or process as described in or related to any of examples 1-82, or portions thereof.

Example 86 may include a signal as described in or related to any of examples 1-82, or portions or parts thereof.

Example 87 may include a datagram, packet, frame, segment, protocol data unit (PDU), or message as described in or related to any of examples 1-82, or portions or parts thereof, or otherwise described in the present disclosure.

Example 88 may include a signal encoded with data as described in or related to any of examples 1-82, or portions or parts thereof, or otherwise described in the present disclosure.

Example 89 may include a signal encoded with a datagram, packet, frame, segment, protocol data unit (PDU), or message as described in or related to any of examples 1-82, or portions or parts thereof, or otherwise described in the present disclosure.

Example 90 may include an electromagnetic signal carrying computer-readable instructions, wherein execution of the computer-readable instructions by one or more processors is to cause the one or more processors to perform the method, techniques, or process as described in or related to any of examples 1-82, or portions thereof.

Example 91 may include a computer program comprising instructions, wherein execution of the program by a processing element is to cause the processing element to carry out the method, techniques, or process as described in or related to any of examples 1-82, or portions thereof.

Example Z12 may include a signal in a wireless network as shown and described herein.

Example Z13 may include a method of communicating in a wireless network as shown and described herein.

Example Z14 may include a system for providing wireless communication as shown and described herein.

Example Z15 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Terminology

For the purposes of the present document, the following terms and definitions are applicable to the examples and embodiments discussed herein.

The term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, and/or transferring digital data. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. The terms "application circuitry" and/or "baseband circuitry" may be considered synonymous to, and may be referred to as, "processor circuitry."

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "resource" as used herein refers to a physical or virtual device, a physical or virtual component within a computing environment, and/or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information.

The terms "instantiate," "instantiation," and the like as used herein refers to the creation of an instance. An "instance" also refers to a concrete occurrence of an object, which may occur, for example, during execution of program code.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like.

The term "information element" refers to a structural element containing one or more fields. The term "field" refers to individual contents of an information element, or a data element that contains content.

The term "SMTC" refers to an SSB-based measurement timing configuration configured by SSB-MeasurementTimingConfiguration.

The term "SSB" refers to an SS/PBCH block.

The term "a "Primary Cell" refers to the MCG cell, operating on the primary frequency, in which the UE either performs the initial connection establishment procedure or initiates the connection re-establishment procedure.

The term "Primary SCG Cell" refers to the SCG cell in which the UE performs random access when performing the Reconfiguration with Sync procedure for DC operation.

The term "Secondary Cell" refers to a cell providing additional radio resources on top of a Special Cell for a UE configured with CA.

The term "Secondary Cell Group" refers to the subset of serving cells comprising the PSCell and zero or more secondary cells for a UE configured with DC.

The term "Serving Cell" refers to the primary cell for a UE in RRC_CONNECTED not configured with CA/DC there is only one serving cell comprising of the primary cell.

The term "serving cell" or "serving cells" refers to the set of cells comprising the Special Cell(s) and all secondary cells for a UE in RRC_CONNECTED configured with CA/.

The term "Special Cell" refers to the PCell of the MCG or the PSCell of the SCG for DC operation; otherwise, the term "Special Cell" refers to the Pcell.

The invention claimed is:

1. One or more non-transitory computer-readable media (NTCRM) having instructions, stored thereon, that when executed by one or more processors cause a user equipment (UE) to:
receive physical uplink shared channel (PUSCH) configuration information for a plurality of pre-allocated uplink resource (PUR) sets that are available for the UE to use for transmission of PUSCHs without transmitting a physical random access channel (PRACH) preamble to access an associated cell, wherein individual PUR sets of the plurality of PUR sets include one or more PUSCH resources or occasions, and wherein the plurality of PUR sets are non-overlapping;
determine, while the UE is in a RRC_IDLE state or a RRC_INACTIVE state, a first PUR set, of the plurality of PUR sets, to use for a PUSCH message based on a modulation and coding scheme (MCS) and/or a transport block size (TBS) of the PUSCH message; and
encode, while the UE is in the RRC_IDLE state or the RRC_INACTIVE state, the PUSCH message for transmission in one or more of the PUSCH resources or occasions of the first PUR set without transmitting a corresponding PRACH preamble, wherein the UE remains in the RRC_IDLE or the RRC_INACTIVE state during the transmission of the PUSCH message.

2. The one or more NTCRM of claim 1, wherein the instructions, when executed, are further to cause the UE to determine a first resource or occasion from the determined first PUR set based on a synchronization signal block (SSB), wherein the data transmission is performed on the determined first PUSCH resource or occasion.

3. The one or more NTCRM of claim 1, wherein the configuration information is received via NR minimum system information (MSI) signaling, NR remaining minimum system information (RMSI) signaling, NR other system information (OSI) signaling, or radio resource control (RRC) signaling.

4. The one or more NTCRM of claim 1, wherein individual PUR sets of the plurality of PUR sets are associated with respective individual TBSs and/or MCSs.

5. The one or more NTCRM of claim 1, wherein one or more PUR sets of the plurality of PUR sets include multiple PUSCH resources or PUSCH occasions.

6. The one or more NTCRM of claim 1, wherein the PUSCH configuration information includes one or more of: a time domain resource allocation; a frequency domain resource allocation; numerology; waveform; a demodulation reference signal (DMRS) related configuration; hybrid automatic repeat request (HARM) related parameters; or an indication of whether uplink control information (UCI) is multiplexed on PUSCH transmission.

7. The one or more NTCRM of claim 1, wherein the instructions, when executed, are further to cause the UE to transmit or cause transmission of uplink control information (UCI) in the PUSCH message to indicate the MCS, TBS, and/or PUR set used for transmission of the PUSCH message.

8. The one or more NTCRM of claim 1, wherein the instructions, when executed, are further to cause the UE to perform DMRS partitioning between the PUSCH message and another PUSCH message that is transmitted with different MCS or TBS in a same time and frequency resource, to indicate the MCS or TBS of the corresponding PUSCH message.

9. The one or more NTCRM of claim 1, wherein the instructions, when executed, are further to cause the UE to determine a time domain duplexing (TDD) downlink (DL)-uplink (UL) configuration of a cell or bandwidth part (BWP) on which the PUSCH message is to be transmitted; and transmit or cause transmission of the PUSCH message in UL symbols or flexible symbols within a slot based on the TDD DL-UL configuration.

10. One or more non-transitory computer-readable media (NTCRM) having instructions, stored thereon, that when executed by one or more processors cause a next generation Node B (gNB) to:
encode, for transmission to a user equipment (UE), physical uplink shared channel (PUSCH) configuration information for a plurality of pre-allocated uplink resource (PUR) sets that are available for the UE to use for transmission of PUSCHs without transmitting a physical random access channel (PRACH) preamble to access an associated cell, wherein individual PUR sets of the plurality of PUR sets include one or more PUSCH resources or occasions, and wherein the individual PUR sets are associated with respective modulation and coding schemes (MCSs) and/or transport block sizes (TBSs); and
receive, from the UE while the UE is in a RRC_IDLE state or a RRC_INACTIVE state, a PUSCH transmission in one or more PUSCH resources or occasions of a first PUR set that is associated with an MCS and/or TBS of the PUSCH transmission, wherein the PUSCH transmission is received without receipt of a corresponding PRACH preamble.

11. The one or more NTCRM of claim 10, wherein the PUSCH transmission is received in a first resource or occasion of the first PUR set that is associated with a synchronization signal block (SSB) of the gNB.

12. The one or more NTCRM of claim 11, wherein the configuration information is transmitted via NR minimum system information (MSI) signaling, NR remaining minimum system information (RMSI) signaling, NR other system information (OSI) signaling, or radio resource control (RRC) signaling.

13. The one or more NTCRM of claim 10, wherein individual PUR sets of the plurality of PUR sets are associated with respective individual TBSs and/or MCSs.

14. The one or more NTCRM of claim 10, wherein one or more PUR sets of the plurality of PUR sets include multiple PUSCH resources or PUSCH occasions.

15. The one or more NTCRM of claim 10, wherein the PUSCH configuration information includes one or more of: a time domain resource allocation; a frequency domain resource allocation; a numerology; a waveform; a demodulation reference signal (DMRS) related configuration; hybrid automatic repeat request (HARQ) related parameters; or an indication of whether uplink control information (UCI) is multiplexed on the PUSCH transmission.

16. The one or more NTCRM of claim 10, wherein the instructions, when executed are further to cause the gNB to receive uplink control information (UCI) in the PUSCH transmission to indicate the MCS, TBS, and/or PUR set used for the PUSCH transmission.

17. The one or more NTCRM of claim 10, wherein the instructions, when executed are further to cause the gNB to identify the MCS or TBS of the PUSCH transmission based on DMRS partitioning between the PUSCH transmission and another PUSCH that is transmitted with different MCS or TBS in a same time and frequency resource.

18. The one or more NTCRM of claim 10, wherein the instructions, when executed, further cause the gNB to: determine a scrambling sequence for the PUSCH transmission based on an SSB index, a DMRS index and/or a configurable ID.

* * * * *

UNITED STATES PATENT AND TRADEMARK OFFICE
CERTIFICATE OF CORRECTION

PATENT NO. : 11,895,680 B2
APPLICATION NO. : 17/032700
DATED : February 6, 2024
INVENTOR(S) : Gang Xiong et al.

Page 1 of 1

It is certified that error appears in the above-identified patent and that said Letters Patent is hereby corrected as shown below:

In the Claims

Column 43
Claim 6, Line 9, replace "(HARM)" after "repeat request" and before "related configuration;" with "(HARQ)".

Signed and Sealed this
Nineteenth Day of March, 2024

Katherine Kelly Vidal
*Director of the United States Patent and Trademark Office*